United States Patent [19]

Izumi et al.

[11] Patent Number: 5,691,072
[45] Date of Patent: Nov. 25, 1997

[54] MAGNETO-OPTICAL RECORDING MEDIUM AND METHOD OF REPRODUCING INFORMATION RECORDED ON SUCH MEDIUM

[75] Inventors: Haruhiko Izumi; Ken Tamanoi; Masaharu Moritsugu; Miyozo Maeda; Toshio Sugimoto; Koji Matsumoto; Motonobu Mihara, all of Kawasaki, Japan

[73] Assignee: Fujitsu Limited, Kawasaki, Japan

[21] Appl. No.: 381,642

[22] Filed: Jan. 31, 1995

[30] Foreign Application Priority Data

Mar. 15, 1994  [JP]  Japan ................... 6-044390
Sep. 19, 1994  [JP]  Japan ................... 6-223277

[51] Int. Cl.⁶ .................. G11B 5/66; G11B 11/00
[52] U.S. Cl. .......... 428/694 ML; 428/694 RE; 428/694 MM; 428/694 EC; 428/694 GR; 428/900; 369/13; 369/275.1; 369/275.2; 369/275.3; 369/275.4; 369/284; 369/286; 369/288; 360/59; 360/114
[58] Field of Search ............ 428/694 ML, 694 RE, 428/694 MM, 694 EC, 694 GR, 900; 369/13, 275.1, 275.4, 284, 286, 288; 360/53, 114

[56] References Cited

U.S. PATENT DOCUMENTS

| | | | |
|---|---|---|---|
| 4,518,657 | 5/1985 | Yanagida | 428/450 |
| 5,016,232 | 5/1991 | Todokono | 369/13 |
| 5,094,925 | 3/1992 | Ise | 428/694 MM |
| 5,239,534 | 8/1993 | Matsumoto | 365/288 |
| 5,309,427 | 5/1994 | Matsumoto | 365/275.2 |

FOREIGN PATENT DOCUMENTS 0509836  10/1992  European Pat. Off. .

*Primary Examiner*—Leszek Kiliman
*Attorney, Agent, or Firm*—Greer, Burns & Crain, Ltd.

[57] ABSTRACT

Disclosed is a magneto-optical recording medium adapted for reproduction of a high resolution signal without the necessity of a reproducing magnetic field, whereby the magneto-optical recording medium comprises a transparent substrate, a reproducing layer, a switch layer and a recording layer formed on the transparent substrate successively. The reproducing layer is a perpendicular magnetization film at a room temperature but is turned to an in-plane magnetization film when heated beyond a predetermined temperature. Each of the switch layer and the recording layer is a perpendicular magnetization film. The respective Curie temperatures Tc1, Tc2 and Tc3 of the reproducing layer, the switch layer and the recording layer satisfy the relationship of $Tc1 > Tc3 > Tc2$.

26 Claims, 15 Drawing Sheets

Sector mark detection
ID read gate
ID detection signal
Data read gate
Reproducing laser power

MAGNETO-OPTICAL RECORDING MEDIUM AND METHOD OF REPRODUCING INFORMATION RECORDED ON SUCH MEDIUM

BACKGROUND OF THE INVENTION

1. Field of the Invention

The present invention relates to a high-density magneto-optical recording medium and a method of reproducing information recorded on such a medium.

2. Description of the Related Art

In regard to a magneto-optical disk known as a high-density recording medium, it is currently demanded to achieve a further enhanced density in accordance with increase in the amount of information. Although a higher density can be realized by reducing the space between record marks, recording and reproduction of such marks are limited by the size of a laser beam (beam spot) on the medium. When the space is so set that merely a single record mark is existent within the beam spot, an output waveform corresponding to "1" or "0" determined by the presence or absence of a record mark can be observed as a reproduced signal.

However, if the space is so narrowed that several record marks are existent within the beam spot, no change is caused in the reproduced output regardless of any movement of the beam spot on the medium, so that the output waveform is rendered linear to consequently raise a problem that the presence or absence of any record mark is not discriminable. The beam spot may be dimensionally reduced for the purpose of attaining proper reproduction of small record marks having a period smaller than the size of the beam spot, but the dimensions of the beam spot are restricted by the wavelength $\lambda$ of a light beam source and the numerical aperture NA of an objective lens, so that it is impossible to sufficiently reduce the dimensions of the beam spot.

Recently, there is proposed a novel reproduction method which utilizes an existing optical system without any modification and reproduces record marks smaller than the size of a beam spot by the use of a magnetically induced super-resolution medium (hereinafter referred to as MSR medium). This method is effective to enhance the resolution of reproduction by masking other marks during reproduction of one mark within the beam spot. Therefore, at least a mask layer or a reproducing layer is required, in addition to a recording layer, in the MSR medium for concealing all other marks so that only one mark is reproduced in a signal reproduction mode.

Hereinafter a brief description will be given on the MSR medium and a method of recording information on and reproducing the same from such medium. FIG. 1 shows the structure of the MSR medium disclosed in Jpn. J. Appl. Phys. Vol. 31 (1992) pp. 568–575 part 1. No. 2B, February 1992, and the positional relationship between record marks and a beam spot on a record track. On an unshown transparent substrate, there are successively formed a magnetic reproducing layer 2, a magnetic switch layer 3 and a magnetic recording layer 4 in this order. Data are recorded in the recording layer 4 by the directions of magnetization, and record marks 6 are formed on the record track 5 at a pitch smaller than the diameter of the spot of an irradiated laser beam.

The reproducing layer 2 is composed of GdFeCo, and its Curie temperature is higher than 300° C. Meanwhile the switch layer 3 is composed of GdFeCoAl, and its Curie temperature is approximately 140° C. And the recording layer 4 is composed of GdFeCo, and its Curie temperature is approximately 250° C. In the case of a magneto-optical recording medium, the area heated beyond a Curie temperature Tc is dimensionally reducible to be smaller than the diameter of a laser beam spot by controlling the power of the laser beam in a recording mode, whereby it is made not so difficult to form small record marks.

Now a description will be given on a method of reproducing information recorded on the medium. At a room temperature, the magnetization of the reproducing layer is rendered directionally coincident with that of the recording layer 4 by switched connection or exchange bond through the switch layer 3. However, in any portion (high temperature region) where the temperature is raised beyond the Curie temperature Tc of the switch layer 3 due to irradiation of a reproducing laser beam 7, the switched connection between the recording layer 4 and the reproducing layer 2 is turned off, so that the magnetization of the relevant portion of the reproducing layer 2 is directionally turned to be the same as a reproducing magnetic field Hr applied from an external source. Consequently, the high temperature region serves as a mask to cover the record mark, whereby the data recorded in the recording layer 4 can be read out from the low temperature region within the beam spot 8. In this manner, the record mark can be read out from the region smaller than the beam spot diameter of the reproducing laser beam, so that it becomes possible to attain a resolution substantially equal to the value obtained by reproducing the information with a beam spot smaller in diameter than that of the reproducing laser beam.

FIG. 2 graphically shows the reproduced signal characteristics obtained by the use of the above MSR medium and a conventional ordinary magneto-optical recording medium, respectively. In the case of using the MSR medium, satisfactory reproduction characteristic can be attained even when the recording linear density is raised and the record marks are rendered smaller. The above-described method of reading out a record mark from a low temperature region while masking a high temperature region within a beam spot is termed an FAD (Front Aperture Detection) system.

Contrary to the above, a method of reading out a record mark from a high temperature region while masking a low temperature region within a beam spot is termed an RAD (Rear Aperture Detection) system, which is also capable of achieving high-resolution reproduction similarly to the FAD system. This RAD system can be realized by a magneto-optical disk of a dual film structure consisting of a magnetic reproducing layer and a magnetic recording layer. An initializing magnetic field is applied immediately before irradiation of a reproducing laser beam, and when a record mark has passed through the initializing magnetic field, the magnetization of merely the reproducing layer is directionally turned to be coincident with the initializing magnetic field.

In this stage of the operation, the recording layer holds the record mark. Immediately after application of the initializing magnetic field, the reproducing layer serves as a mask since the data in the recording layer is covered with the reproducing layer. And upon irradiation of a reproducing laser beam, the temperature of the reproducing layer serving as a mask is raised. When the strength of switched connection between the recording layer and the reproducing layer has exceeded the coercive force of the reproducing layer, the direction of magnetization of the recording layer is transferred to the reproducing layer. It signifies that the mask of the reproducing layer is removed from the high temperature region, whereby the record mark can be read out from the high temperature region.

Thus, in reproducing the MSR medium based on the FAD system, application of a reproducing magnetic field Hr is needed as described above. However, in an ordinary magneto-optical disk reproducing apparatus which is so constructed that no magnetic field is applied during a reproduction mode, there exists a problem that any information recorded on the MSR medium cannot be reproduced in the unmodified current construction of the known ordinary apparatus. FIG. 3 graphically shows the relationship between the peripheral velocity of the MSR medium and the power of a reproducing laser beam. This graph represents the minimum reproducing laser power required to obtain a C/N higher than 43 dB under the conditions including a mark length of 0.4 μm with changes of the peripheral velocity.

The reproducing laser power for the ordinary magneto-optical disk ranges from 1.0 to 1.5 mW or so and has no dependency on the peripheral velocity, whereas the reproducing laser power for the MSR medium is considerably greater and its minimum required power varies depending on the peripheral velocity. Therefore, in the ordinary magneto-optical disk, no particular problem is exists if a laser power of the above value is maintained to cause continuous emission of a laser diode. But in the MSR medium, there arises a serious problem that continuous maintenance of a high laser power during a reproduction mode deteriorates the service life of the laser diode.

SUMMARY OF THE INVENTION

It is therefore an object of the present invention to provide a high-density magneto-optical recording medium from which information recorded thereon can be reproduced by the use of an ordinary magneto-optical medium reproducing apparatus without the necessity of applying any magnetic field in a reproduction mode.

Another object of the present invention resides in providing a high-density magneto-optical recording medium adapted for enhancing a reproduction output by completely masking any mark adjacent to a desired mark to be reproduced.

A further object of the invention is to provide an information reproducing method which is capable of exactly reproducing the information recorded at a high density on a magneto-optical recording medium.

A still further object of the invention is to provide a method of reproducing information recorded on a magneto-optical recording medium, which is adequate to prevent temporal reduction of the service life of a light beam source by increasing the power of a reproducing laser beam merely at the time of reproducing the recorded information.

According to a first aspect of the present invention, there is provided a magneto-optical recording medium which comprises a transparent substrate; a magnetic reproducing layer formed on the transparent substrate and having an easy direction of magnetization perpendicular to the film plane at a room temperature, and having an in-plane easy direction of magnetization when heated beyond a predetermined temperature; a magnetic switch layer formed on the reproducing layer and having an easy direction of magnetization perpendicular to the film plane; and a magnetic recording layer formed on the switch layer and having an easy direction of magnetization perpendicular to the film plane; wherein the respective Curie temperatures Tc1, Tc2 and Tc3 of the above reproducing layer, switch layer and recording layer satisfy the relationship of Tc1>Tc3>Tc2.

According to a second aspect of the present invention, there is provided a magneto-optical recording medium which comprises a transparent substrate; a magnetic reproducing layer formed on the transparent substrate and having an in-plane easy direction of magnetization at a room temperature, and having an easy direction of magnetization perpendicular to the film plane when heated beyond a first predetermined temperature; a magnetic reproducing auxiliary layer formed on the reproducing layer and having an easy direction of magnetization perpendicular to the film plane at a room temperature, and having an in-plane easy direction of magnetization when heated beyond a second predetermined temperature; a magnetic switch layer formed on the reproducing auxiliary layer and having an easy direction of magnetization perpendicular to the film plane; and a magnetic recording layer formed on the switch layer and having an easy direction of magnetization perpendicular to the film plane; wherein the respective Curie temperatures Tc1, Tc2, Tc3 and Tc4 of the above reproducing layer, reproducing auxiliary layer, switch layer and recording layer satisfy the relationship of Tc1>Tc2>Tc4>Tc3.

According to a third aspect of the present invention, there is provided a magneto-optical recording medium which comprises a transparent substrate; a magnetic reproducing layer formed on the transparent substrate and having an easy direction of magnetization perpendicular to the film plane in a specific heated region, and having an in-plane easy direction of magnetization in any other region where the temperature is lower or higher than that of the specific heated region; a magnetic switch layer formed on the reproducing layer and having an easy direction of magnetization perpendicular to the film plane; and a magnetic recording layer formed on the switch layer and having an easy direction of magnetization perpendicular to the film plane; wherein the respective Curie temperatures Tc1, Tc2 and Tc3 of the above reproducing layer, switch layer and recording layer satisfy the relationship of Tc1>Tc3>Tc2.

In the above structure, a nonmagnetic intermediate layer may be disposed, instead of the magnetic switch layer, between the reproducing layer and the recording layer.

And according to a fourth aspect of the present invention, there is provided a method of reproducing the information recorded on each of the aforementioned recording media. In the information reproducing method of the invention, it is possible to form, without the necessity of a reproducing magnetic field, a temperature distribution including a low temperature region and a high temperature region within a beam spot or a temperature distribution including a low temperature region, an intermediate temperature region and a high temperature region within the beam spot, thereby realizing proper reproduction of a record mark smaller than the diameter of the beam spot.

In reproduction of the information recorded on the recording medium according to the first aspect, a laser beam is irradiated to the medium to thereby form, within the beam spot, a low temperature region and a high temperature region where the switch layer is heated beyond the Curie temperature thereof. In the high temperature region, since the switch layer is thus heated beyond the Curie temperature, the switched connection between the recording layer and the reproducing layer is interrupted, so that the reproducing layer indicates in-plane magnetization. In the in-plane magnetization region of the reproducing layer where the switch layer is heated beyond the Curie temperature, there is substantially no relation to the polarization angle change of the reflected reproducing laser beam, whereby a mask can be formed without applying any reproducing magnetic field, and thus it becomes possible to read out, from the low temperature region within the beam spot, the information transferred from the recording layer to the reproducing layer by the switched connection.

Meanwhile in reproduction of the information recorded on the recording medium according to the second and third aspects, a laser beam is irradiated to the recording medium to form a temperature distribution which includes, within the beam spot, a low temperature mask region, an intermediate temperature transfer region and a high temperature mask region. A magneto-optical signal can be read out only from the intermediate temperature transfer region, whereas none of such signal is read out from the low or high temperature mask region at all. Consequently, it is possible to read out with accuracy a mark of dimensions smaller than the diffraction limit of the laser wavelength.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 4:
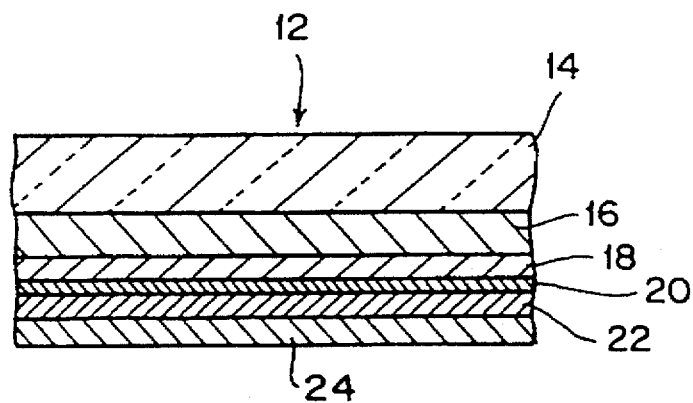
FIG. 4 illustrates the structure of a magneto-optical recording medium in a first embodiment of the present invention.

Referring to FIG. 4, a description will be given on the structure of a magneto-optical recording medium in a first embodiment of the present invention. Denoted by 12 is a magneto-optical recording medium which is normally shaped into a disk. On a transparent substrate 14 composed of glass or the like, a dielectric layer 16 composed of SiN or the like is formed by the technique of, e.g., sputtering. The dielectric layer 16 serves to prevent oxidation and corrosion of a magnetic layer deposited thereon. The transparent substrate 14 may be selectively composed of a suitable resinous material such as polycarbonate, polymethyl methacrylate, or amorphous polyolefin. Meanwhile the dielectric layer 16 may be selectively composed of metal nitride such as AlN, or metal oxide such as $SiO_2$ or $Al_2O_3$, or metal sulfide such as ZnS.

On the dielectric layer 16, there is deposited a magnetic reproducing layer 18 of an amorphous alloy film which is composed of rare-earth and transition metals, such as GdFeCo. The magnetic reproducing layer 18 is a perpendicular magnetization film at a room temperature, and its easy direction of magnetization is turned to be in-plane from the perpendicular one when heated beyond a predetermined temperature by a reproducing laser power. On the magnetic reproducing layer 18 is deposited a magnetic switch layer 20 of an amorphous alloy film which is composed of rare-earth and transition metals, such as TbFeCo. The switch layer 20 is a perpendicular magnetization film. On this switch layer 20, there is deposited a magnetic recording layer 22 of an amorphous metal film composed of rare-earth and transition metals, such as TbFeCo. This magnetic recording layer 22 is a perpendicular magnetization film. It is also possible to adopt DyFeCo for composing the magnetic recording layer 22.

The respective Curie temperatures Tc1, Tc2 and Tc3 of the above-described magnetic reproducing layer 18, magnetic switch layer 20 and magnetic recording layer 22 satisfy the condition of Tc1>Tc3>Tc2. On the magnetic recording layer 22, there is further deposited a protective film 24 to complete a magneto-optical recording medium 12. The protective film 24 is formed for the purpose of protecting the magnetic recording layer 22 from any harmful substance such as water content, oxygen or halogen element in the air. The protective film 24 is composed of metal nitride such as SiN or AlN, metal oxide such as $SiO_2$ or $Al_2O_3$, or metal sulfide such as ZnS.

Figure 5:
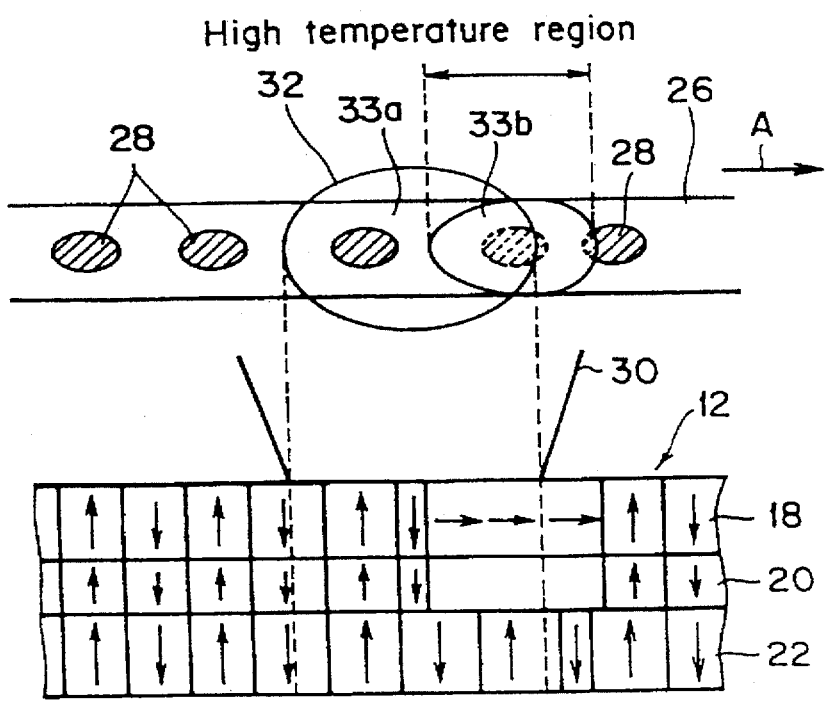
FIG. 5 has an upper portion which is a plan view of a recording medium for explaining a reproducing method relative to the first embodiment of the invention and a lower portion which is a sectional view thereof.

Hereinafter a method of reproducing the information recorded on the magneto-optical recording medium of the first embodiment will be described with reference to FIG. 5. The magneto-optical recording medium 12 is moved in the direction of an arrow A, as illustrated in the upper portion of FIG. 5. And a plurality of marks 28 are formed in a track 26. At a room temperature, the magnetization of the reproducing layer 18 is rendered directionally coincident with that of the recording layer 22 by switched connection effected through the switch layer 20. When a laser beam 30 is irradiated to the recording medium 12, a beam spot 32 is formed on the track 26 as illustrated in FIG. 5, so that there are formed, within the beam spot 32, a low temperature region 33a and a high temperature region 33b heated beyond the Curie temperature of the switch layer 20.

In the high temperature region 33b where the switch layer 20 has been heated beyond the Curie temperature thereof, the switched connection between the recording layer 22 and the reproducing layer 18 is interrupted, so that the reproducing layer 18 indicates in-plane magnetization. Since the high temperature in-plane magnetized region 33b is substantially not concerned with the polarization angle change of the reflected reproducing laser beam, an in-plane mask can be formed without application of any reproducing magnetic field, whereby it is made possible to obtain, through the low temperature region 33a, a magneto-optical signal of the mark recorded in the recording layer 22.

Now a specific example of the magneto-optical recording medium in the first embodiment will be described below. An SiN dielectric layer 16, a GdFeCo reproducing layer 18, a TbFeCo switch layer 20, a TbFeCo recording layer 22 and an SiN protective layer 24 were formed successively on a polycarbonate substrate 14 by the art of sputtering. The deposition of such layers by sputtering was executed in a vacuum chamber at an ultimate vacuum degree lower than $5\times10^{-5}$ Pa under the conditions including an Ar gas pressure of 0.2 Pa and a making power of 0.8 kW at the time of forming the SiN layers 16 and 24, and an Ar gas pressure of 0.5 Pa and a making power of 1.0 kW at the time of forming the magnetic layers 18, 20 and 22.

The magnetic reproducing layer 18 has a composition of $Gd_{23}(Fe_{77}Co_{23})_{77}$, the magnetic switch layer 22 has a composition of $Gd_{20}(Fe_{98}Co_2)_{80}$, and the magnetic recording layer has a composition of $Tb_{20}(Fe_{90}Co_{10})_{80}$. The magnetic layers 16, 20 and 22 are, in film thickness, 20 nm, 10 nm and 40 nm respectively. Meanwhile the Curie temperatures of the reproducing layer 18, the switch layer 20 and the recording layer 22 are 330° C., 145° C. and 220° C. respectively. Although the film thickness of the reproducing layer 18 is set to 20 nm in this example, it may be 10 nm or so.

If the rate of Gd in the GdFeCo reproducing layer 18 is set to 18–24 atomic percent which signifies a TM (transition metal) rich composition, the reproducing layer 18 itself individually indicates in-plane magnetization at least in a range up to the Curie temperature thereof from above the Curie temperature of the switch layer 20, but presents perpendicular magnetization due to the switched connection with the switch layer 20. Consequently, an adequate amount of Gd ranges from 18 to 24 atomic percent.

When the Curie temperature of the switch layer 20 is so high as to be excessively proximate to the Curie temperature of the recording layer 22, a desired mask is not formable unless a great reproducing laser power is employed, so that the data in the recording layer 22 may possibly be erased. To the contrary, if the Curie temperature of the switch layer 20 is improperly low, a mask region is formed to be inadequately large to cause a fall of the reproduced signal level, hence deteriorating the reproduction capability. Therefore the proper Curie temperature of the switch layer 20 is considered to range from 120° C. to 140° C.

Marks each having a length of 0.4 μm were recorded on the magneto-optical recording medium of the above exemplary composition under the recording and reproducing conditions including a peripheral velocity of 9 m/sec, a recording laser power of 20 mW, a light emission duty ratio of 33 percent and a reproducing laser power of 2.5 mW. The C/N measured by first irradiating a reproducing laser power of 2.5 mw to the recording medium without application of any reproducing magnetic field and then reading out a magneto-optical signal from the medium was approximately 44.5 dB, whereby it was confirmed that a satisfactory reproduction output is obtainable.

Figure 6:
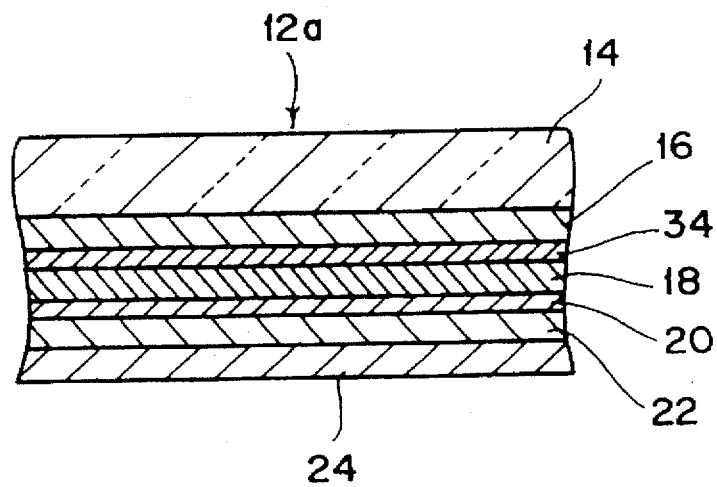
FIG. 6 illustrates the structure of a magneto-optical recording medium in a second embodiment of the invention.

FIG. 6 illustrates the structure of a magneto-optical recording medium 12a in a second embodiment of the present invention. In this embodiment, a magnetic auxiliary layer 34 having the same composition as that of the switch layer 20 is interposed, in addition to the structure of the foregoing first embodiment, between the dielectric layer 16 and the magnetic reproducing layer 18. Since the magnetic auxiliary layer 34 presents perpendicular magnetization due to switched connection with the reproducing layer 18, it is expectable to attain the effect of enhancing the perpendicularity of magnetization in the reproducing layer 18 below the Curie temperature of the switch layer 20.

The auxiliary layer 34 needs to be sufficiently thin so as not to impede transmission of a laser beam from the transparent substrate 14 to the reproducing layer 18, and specifically a desired film thickness is 5 nm or so. Since a method of reproducing the information in this embodiment is the same as that relative to the aforementioned first embodiment, a repeated explanation thereof is omitted here.

Figure 7:
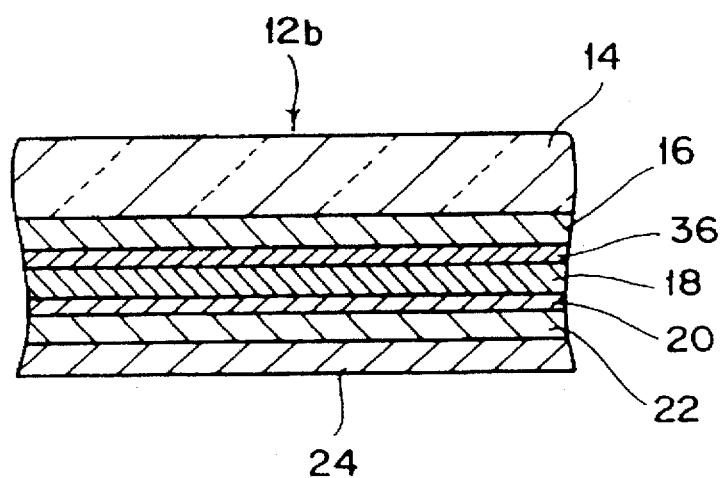
FIG. 7 illustrates the structure of a magneto-optical recording medium in a third embodiment of the invention.

Referring next to FIG. 7, a description will be given on the structure of a magneto-optical recording medium 12b in a third embodiment of the present invention. In this diagram, any like components substantially corresponding to those in the aforesaid first embodiment are denoted by like reference numerals. On a dielectric layer 16, there is deposited a magnetic reproducing layer 36 of an amorphous alloy film which is composed of rare-earth and transition metals such as GdFeCo of an RE (rare earth) rich composition and is turned from in-plane magnetization to perpendicular one when heated beyond a first predetermined temperature.

A reproducing auxiliary layer 18 is a magnetic film corresponding to the reproducing layer in the first embodiment and is composed of an amorphous alloy of rare-earth and transition metals such as GdFeCo of a TM (transition metal) rich composition and is turned from perpendicular magnetization to in-plane magnetization when heated beyond a second predetermined temperature. The Curie temperature of a magnetic switch layer 20 is lower than that of any of the reproducing layer 36, the reproducing auxiliary layer 18 and the recording layer 22. The switch layer 20 is a film of TbFeCo which is retained above its Curie temperature in a temperature range where the reproducing auxiliary layer 18 in particular is turned to in-plane magnetization.

The respective Curie temperatures Tc1, Tc2, Tc3 and Tc4 of the above reproducing layer 36, reproducing auxiliary layer 18, switch layer 20 and recording layer 22 have the relationship of Tc1>Tc2>Tc4>Tc3. The recording layer 22 is a film of TbFeCo or DyFeCo whose coercive force is greater than that of any of the reproducing layer 36, the reproducing auxiliary layer 18 and the switch layer 20.

Figure 8:
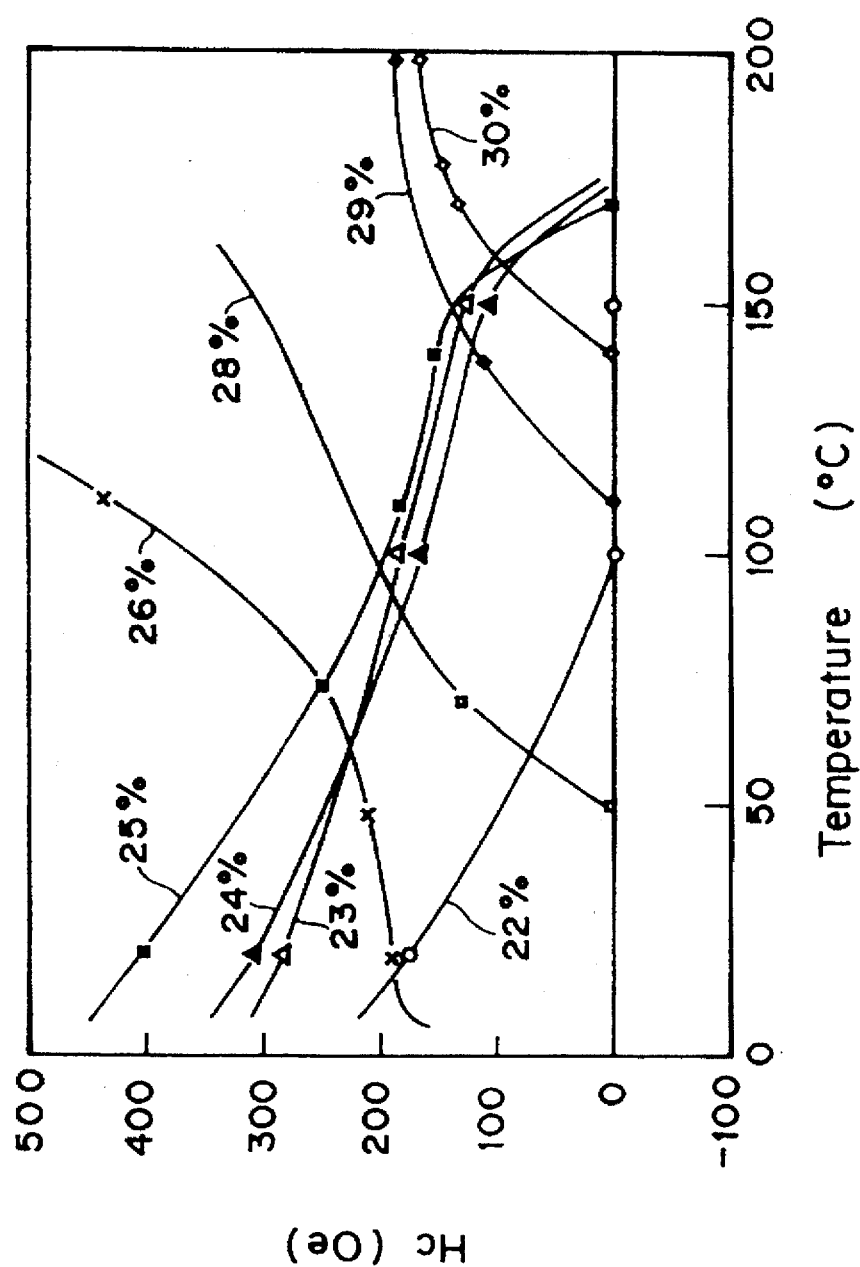
FIG. 8 graphically shows the temperature dependency of the coercive force of a GdFeCo single layer film to the amount of Gd.

Referring now to FIG. 8, there is graphically shown the temperature dependency of the coercive force of a GdFeCo single layer film to the amount of Gd. In the magneto-optical recording medium 12b of this embodiment, it is preferred that the amount of Gd contained in the reproducing layer 36 be within a range of 29 to 32 atomic percent. The reason is based on the fact that, if the amount of Gd is greater than 32 atomic percent in FIG. 8, in-plane magnetization is induced up to high temperature and therefore a transfer region of perpendicular magnetization is not formable and also that, if the amount of Gd is smaller than 29 atomic percent, perpendicular magnetization is induced even at low temperature and consequently a low temperature in-plane magnetization mask is not formable particularly in a dual layer film.

It is preferred that the amount of Gd contained in the reproducing auxiliary layer 18 be within a range of 18 to 24 atomic percent. If the amount of Gd is decreased, the temperature to achieve in-plane magnetization is lowered, and when the amount is further decreased to be less than 18 atomic percent, it becomes impossible to turn the transfer temperature region to perpendicular magnetization. Meanwhile, if the amount of Gd is increased, the temperature to achieve in-plane magnetization is shifted to be higher and, when the amount of Gd is more than 24 atomic percent, a high temperature in-plane magnetization mask cannot be formed.

Figure 9:
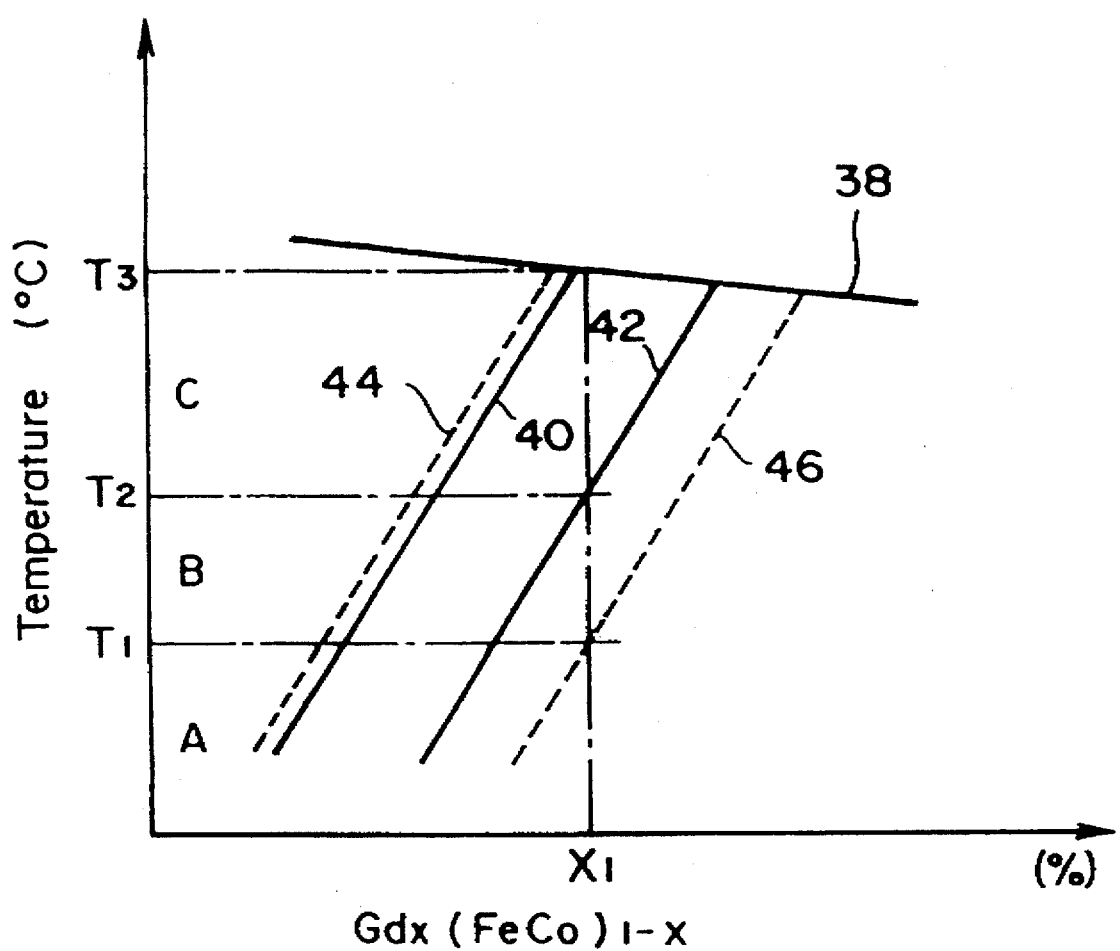
FIG. 9 graphically shows the magnetized state of a GdFeCo film.

The principle of reproduction relative to the third embodiment will now be described below with reference to FIGS. 9, 10A and 10B. FIG. 9 graphically shows a temperature range, where the GdFeCo film is turned to perpendicular magnetization, with respect to the amount of Gd. In this graph, a solid line 38 represents the Curie temperature of GdFeCo. Solid lines 40 and 42 represent the case of a GdFeCo single layer film, while broken lines 44 and 46 represent the case of a dual layer film consisting of a GdFeCo film and a recording layer of perpendicular magnetization formed thereon. More specifically, the solid line 40 indicates the transition temperature of the GdFeCo single layer film at which perpendicular magnetization is turned to in-plane one and the solid line 42 indicates the transition temperature of the GdFeCo single layer film at which in-plane magnetization is turned to perpendicular one. Meanwhile the broken line 44 indicates the transition temperature of the dual layer film consisting of a GdFeCo film and a perpendicular magnetization film, at which perpendicular magnetization is turned to in-plane one; and the other broken line 46 indicates the transition temperature of such dual layer film at which in-plane magnetization is turned to perpendicular one.

As obvious from FIG. 9, it is seen that additional deposition of a perpendicular magnetization film on the GdFeCo film is effective to lower the transition temperature at which in-plane magnetization is turned to perpendicular one. Here, take notice of a certain amount X1 of Gd. In FIG. 9, a symbol A signifies a temperature range of in-plane magnetization. Meanwhile a symbol B signifies a temperature range of perpendicular magnetization in the case of a dual layer film including a perpendicular magnetization film, or a temperature range of in-plane magnetization in the case of a single layer film. And another symbol C signifies a temperature range of perpendicular magnetization.

Figure 10:
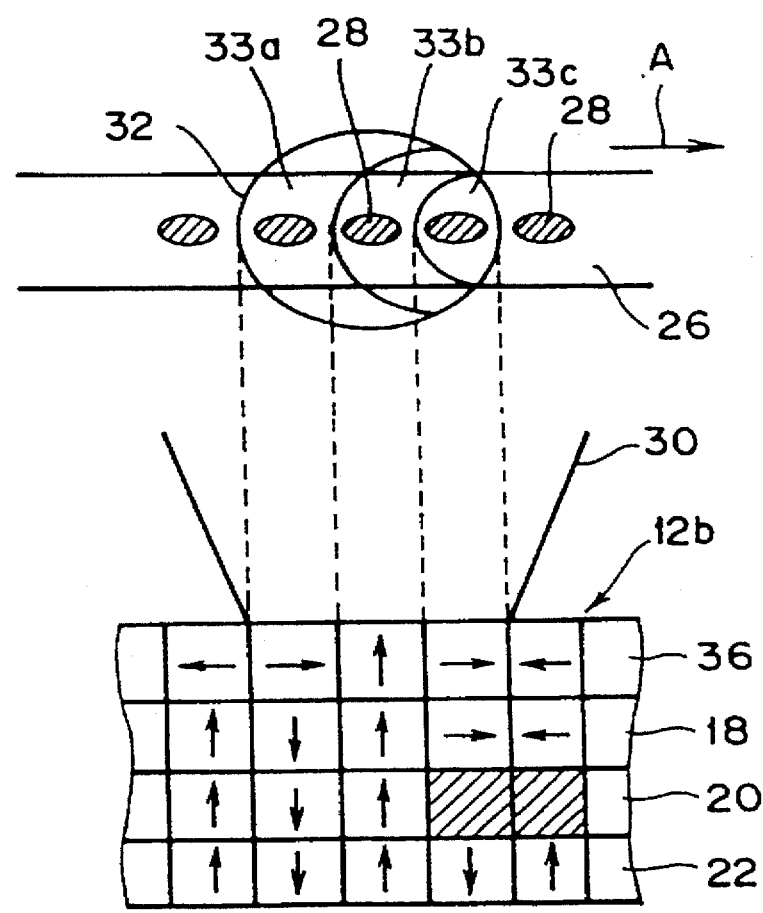
FIG. 10 has an upper portion which is a plan view of a recording medium for explaining a reproducing method relative to a third embodiment of the invention and a lower portion which is a sectional view thereof.

Referring next to FIG. 10, a description will be given on a method of reproducing the information recorded on the magneto-optical recording medium 12b in the third embodiment of the present invention. As shown in FIG. 10, the recording medium 12b is moved in the direction indicated by an arrow A. And a plurality of marks 28 are formed in a track 26. When a reproducing laser beam 30 is irradiated to the recording medium 12b, there is obtained, within a beam spot 32 formed on the track 26 as shown in FIG. 10, a temperature distribution including a low temperature region 33a, an intermediate temperature region 33b and a high temperature region 33c. In the high temperature region 33c, the recording medium 12b is heated beyond the Curie temperature of the switch layer 20.

The reproducing auxiliary layer 18 has perpendicular magnetization in the low temperature region 33a and the intermediate temperature region 33b, but is turned to in-plane magnetization in the high temperature region 33c. Meanwhile the reproducing layer 36 has, in the low temperature region 33a, in-plane magnetization corresponding to the temperature range A shown in FIG. 9. Since the reproducing auxiliary layer 18 has perpendicular magnetization in the intermediate temperature region 33b, the reproducing layer 36 also has perpendicular magnetization in this region. This magnetization corresponds to the case of the aforementioned dual layer film with a perpendicular magnetization film in the temperature range B of FIG. 9. Meanwhile the high temperature region 33c has in-plane magnetization as the reproducing auxiliary layer 18 has in-plane magnetization. This corresponds to the case of the aforementioned single layer film in the temperature range B of FIG. 9.

If the high temperature region 33c is so preset that the switch layer 20 is heated above the Curie temperature thereof, magnetization of the reproducing auxiliary layer 18 is shielded from the perpendicular magnetization of the magnetic recording layer 22, whereby stable in-plane magnetization is attained. In both of the low temperature region 33a and the high temperature region 33c, the reproducing layer 36 has in-plane magnetization which makes no contribution to the Kerr rotation of the reproducing laser beam, so that a mask can be formed.

The magnetization recorded in the recording layer 22 can be read out through the intermediate temperature region 33b by watching the reflected light from the magnetization of the reproducing layer 36. More specifically, since the switch layer 20 is below the Curie point thereof in the intermediate temperature region 33b, the magnetization of the recording layer 22 is transferred by switched connection successively to the switch layer 20, the reproducing auxiliary layer 18 and the reproducing layer 36, whereby a magneto-optical signal can be obtained from the intermediate temperature region 33b. According to this embodiment, two in-plane magnetization masks can be formed within the spot of the reproducing laser beam, so that the high resolution magneto-optical signal is reproducible without the necessity of any reproducing magnetic field.

Hereinafter a specific example of this embodiment will be described. An SiN dielectric layer 16, a GdFeCo reproducing layer 36, a GdFeCo reproducing auxiliary layer 18, a TbFeCo switch layer 20, a TbFeCo recording layer 22 and an SiN protective layer 24 were formed successively on a glass substrate by the art of sputtering. The deposition of such layers by sputtering was executed in a vacuum chamber at an ultimate vacuum degree lower than $5 \times 10^{-5}$ Pa under the conditions including an Ar gas pressure of 0.2 Pa and a making power of 0.8 kW at the time of forming the SiN layers 16 and 24, and an Ar gas pressure of 0.5 Pa and a making power of 1.0 kW at the time of forming the magnetic layers 36, 18, 20 and 22.

The respective compositions of such reproducing layer 36, reproducing auxiliary layer 18, switch layer 20 and recording layer 22 are $Gd_{30}Fe_{35}Co_{15}$, $Gd_{24}Fe_{53}Co_{23}$, $Tb_{20}Fe_{78}Co_2$, and $Tb_{19}Fe_{67}Co_{14}$. These layers are, in film thickness, 40 nm, 25 nm, 10 nm and 40 nm respectively. Meanwhile the Curie temperatures of the reproducing layer 36, the reproducing auxiliary layer 18, the switch layer 20 and the recording layer 22 are 330° C., 280° C., 145° C. and 260° C. respectively. Bits having a mark length of 0.4 μm were recorded on the magneto-optical recording medium 12b, and the performance characteristics were tested under the recording and reproducing conditions including a linear velocity of 8 m/sec, a recording power of 9.5 mW, a light emission duty ratio of 33 percent and a reproducing power of 2.5 mW. From the result of such measurement, it was confirmed that a satisfactory reproduction output having a C/N of approximately 45.5 dB is obtainable without applying any reproducing magnetic field.

Figure 11:
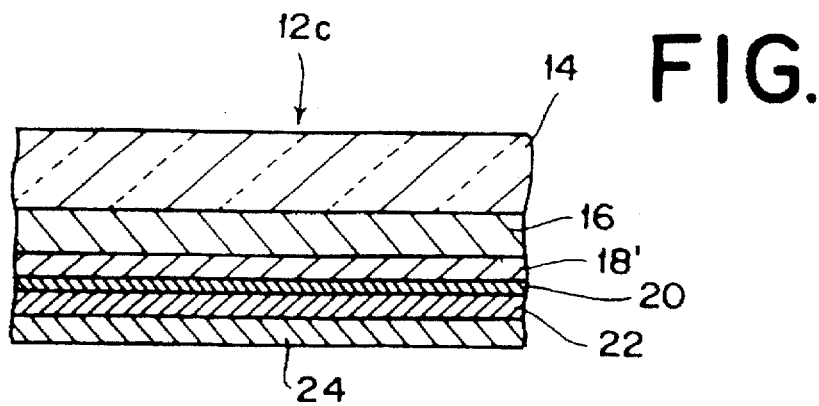
FIG. 11 illustrates the structure of a magneto-optical recording medium in a fourth embodiment of the invention.

FIG. 11 illustrates the structure of a magneto-optical recording medium 12c in a fourth embodiment of the present invention. In a description of this embodiment, any like components substantially corresponding to those in the aforesaid first embodiment of FIG. 4 are denoted by like reference numerals, and the explanation thereof is partially omitted. On a dielectric layer 16, there are deposited a magnetic reproducing layer 18', a magnetic switch layer 20 and a magnetic recording layer 22 are deposited successively in this order, wherein each magnetic layer is an amorphous alloy film composed of rare-earth and transition metals.

Figure 12:
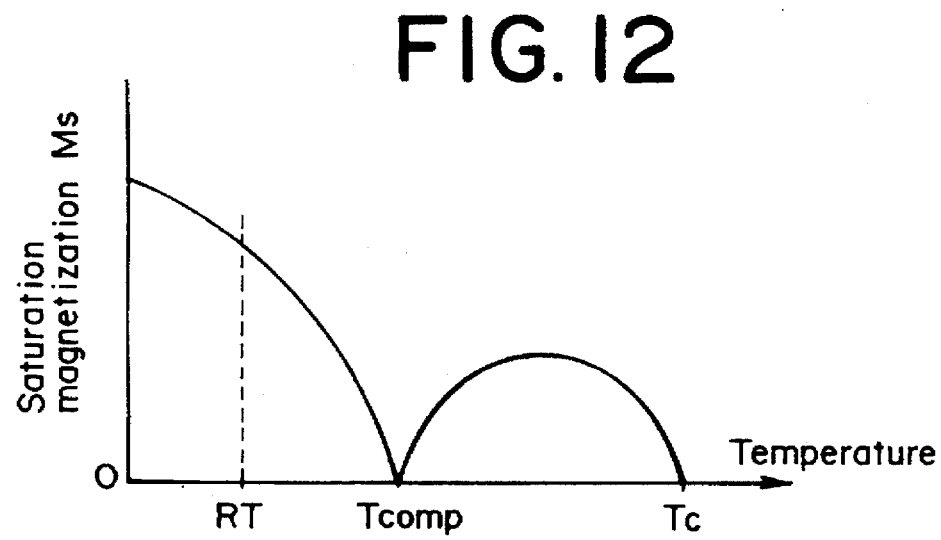
FIG. 12 graphically shows the saturation magnetization Ms of a reproducing layer in the fourth embodiment.
Figure 13:
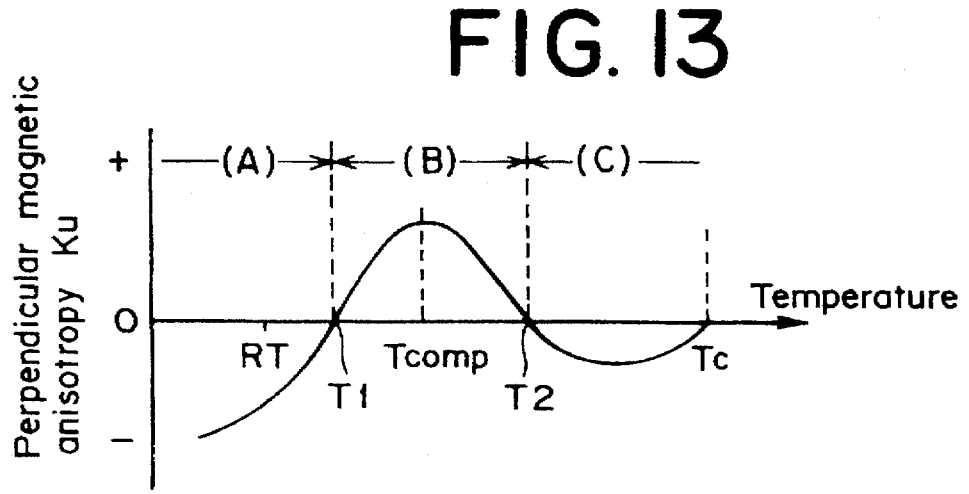
FIG. 13 graphically shows the perpendicular magnetic anisotropy Ku of the reproducing layer in the fourth embodiment.

The magnetic reproducing layer 18' is a GdFeCo film of RE rich composition having such temperature dependency of the saturation magnetization Ms shown in FIG. 12 and the perpendicular magnetic anisotropy Ku shown in FIG. 13. In FIGS. 12 and 13, RT stands for room temperature, Tcomp for compensation temperature, and Tc for Curie temperature, respectively. The alloy GdFeCo is an in-plane magnetization film (Ku<0) at a room temperature (RT) (in a temperature range (A) shown in FIG. 13), but its perpendicular magnetic anisotropy Ku increases in accordance with a rise of the temperature, and this alloy becomes a perpendicular magnetization film (Ku<0) at a temperature T1. Subsequently in accordance with a further rise of the temperature, the perpendicular magnetic anisotropy Ku begins to decrease, and the alloy becomes an in-plane magnetization film again at a temperature T2 (in a range (C)).

Figure 14:
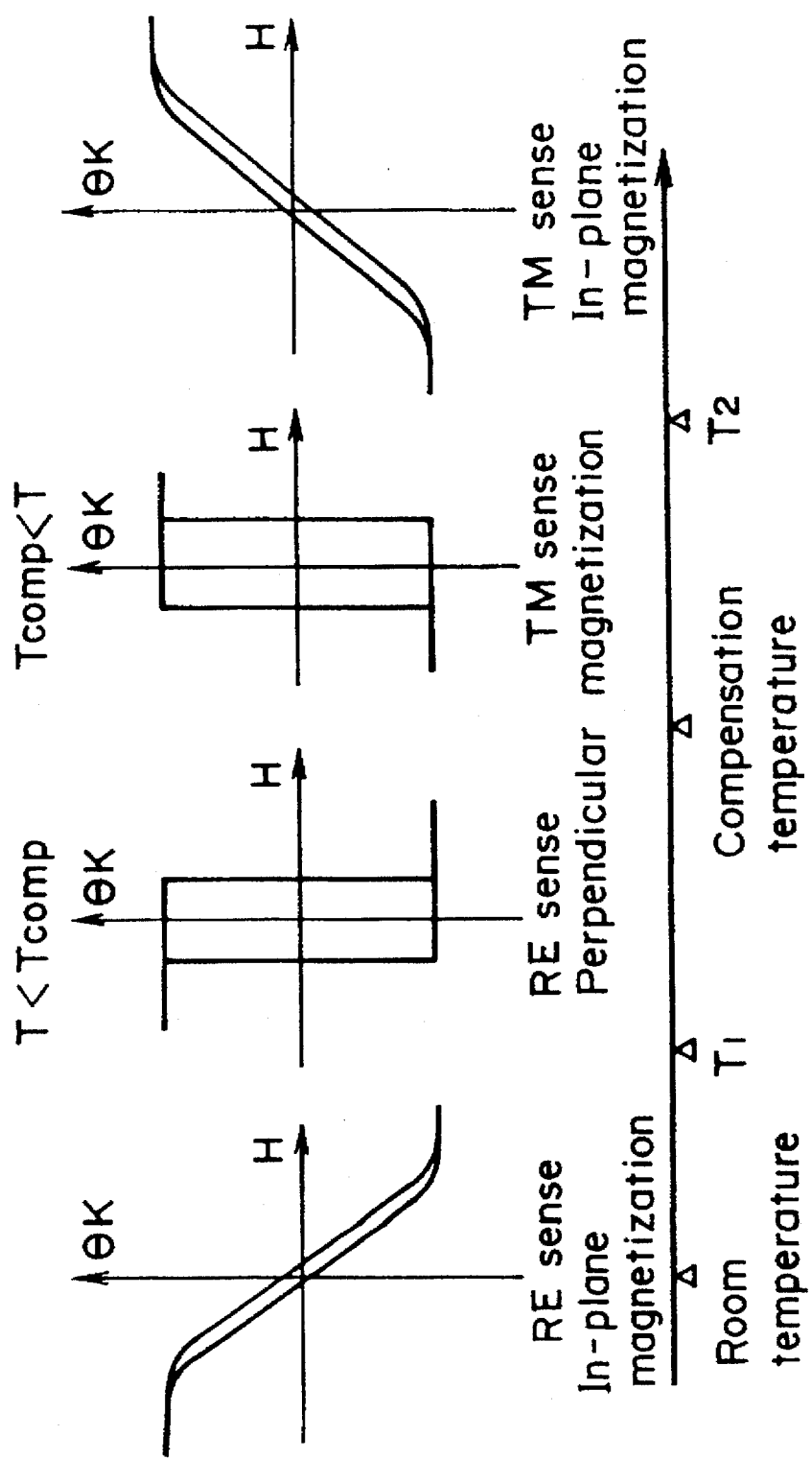
FIG. 14 shows the squareness changes of a GdFeCo film to temperature.

The perpendicular magnetization temperature range B between temperatures T1 and T2 is determined by the composition. If a perpendicular magnetization film is additionally deposited at least on this GdFeCo film to form a structure of two or more layers, the strength of switched connection is exerted thereon to consequently widen the perpendicular magnetization temperature range of the GdFeCo reproducing layer 18' In Table 1, there are listed some exemplary compositions of a GdFeCo single layer film, and the results of measuring the temperature T1 at which an in-plane magnetization film is turned to a perpendicular magnetization film, and also the temperature T2 at which a perpendicular magnetization film is turned to an in-plane magnetization film. FIG. 14 typically shows changes of a magnetic Kerr hysteresis loop of a GdFeCo single layer film to temperature.

TABLE 1

| Composition | T1 | T2 |
| --- | --- | --- |
| $Gd_{28}Fe_{48}Co_{24}$ | 130° C. | 220° C. |
| $Gd_{30}Fe_{43}Co_{27}$ | 200° C. | 240° C. |

TABLE 1-continued

| Composition | T1 | T2 |
| --- | --- | --- |
| $Gd_{33}Fe_{39}Co_{29}$ | 210° C. | 230° C. |
| $Gd_{33}Fe_{35}Co_{32}$ | 220° C. | 240° C. |

As shown in FIG. 14, the GdFeCo film is in a state of in-plane magnetization (RE sense) at a room temperature and therefore has inferior squareness, but when the temperature is raised beyond T1, the film is turned to a state of perpendicular magnetization with superior squareness. And when the temperature is further raised beyond T2, the GdFeCo film is turned to an in-plane magnetization film (TM sense) again. As shown in the measurement example of Table 1, the temperature T1 rises in accordance with an increase of the amounts of Gd and Co, and simultaneously the temperature range of perpendicular magnetization is narrowed. As a result of the experiment, it has been found that an optimal composition of the reproducing layer 18', which is a GdFeCo film, is an RE rich one where the amount of Gd contained therein is in a range of 24 to 35 atomic percent and the amount of Co is in a range of 23 to 35 atomic percent.

The feature of this embodiment resides in that the temperature range B, which is determined by the amounts of Gd and Co and where the reproducing layer 18' is in a state of perpendicular magnetization, is used as an aperture portion for reading out a magneto-optical signal therethrough, and the lower-temperature and higher-temperature regions of in-plane magnetization are used as double masks. It has been confirmed that a film of any other composition than those listed in Table 2, such as $Gd_{26}Fe_{52}Co_{22}$, is not in a state of in-plane magnetization in the low temperature range and its temperature T1 is below the room temperature, and also that a film of $Gd_{23}Fe_{44}Co_{33}$ is a TM sense one and is in a state of in-plane magnetization in the measured temperature range.

Referring to FIG. 11 again, the switch layer 20 consists of a TbFeCo film or a TbFe film whose Curie temperature is lower than that of either of the reproducing layer 18' and the recording layer 22. If the Curie temperature of the switch layer 20 is excessively proximate to that of the recording layer 22, a mask fails to be formed unless the reproducing laser power is great, so that it may cause destruction (erasure) of the data in the recording layer 22. Meanwhile, in case the Curie temperature is excessively low, the mask region is rendered improperly large to thereby reduce the reproduced signal. Considering the circumstances mentioned, an adequate range of the Curie temperature of the switch layer 20 is between 100° C. and 170° C.

The respective Curie temperatures Tc1, Tc2 and Tc3 of the reproducing layer 18', the switch layer 20 and the recording layer 22 satisfy the relationship of Tc1>Tc3>Tc2 . If the Curie temperature of the switch layer 20 is outside the perpendicular magnetization temperature range of the reproducing layer 18', it becomes difficult to transfer the recorded data, which is represented by the direction of magnetization of the recording layer 22, to the reproducing layer 18', and therefore the Curie temperature Tc2 of the switch layer 20 needs to be set within the perpendicular magnetization temperature range of the reproducing layer 18' (between T1 and T2 in FIG. 13). It is preferred that the recording layer 22 has a sufficient coercive force greater than that of either of the reproducing layer 18' and the switch layer 20, and also that the recording layer 22 is a perpendicular magnetization film composed of TbFeCo or DyFeCo.

Figure 15:
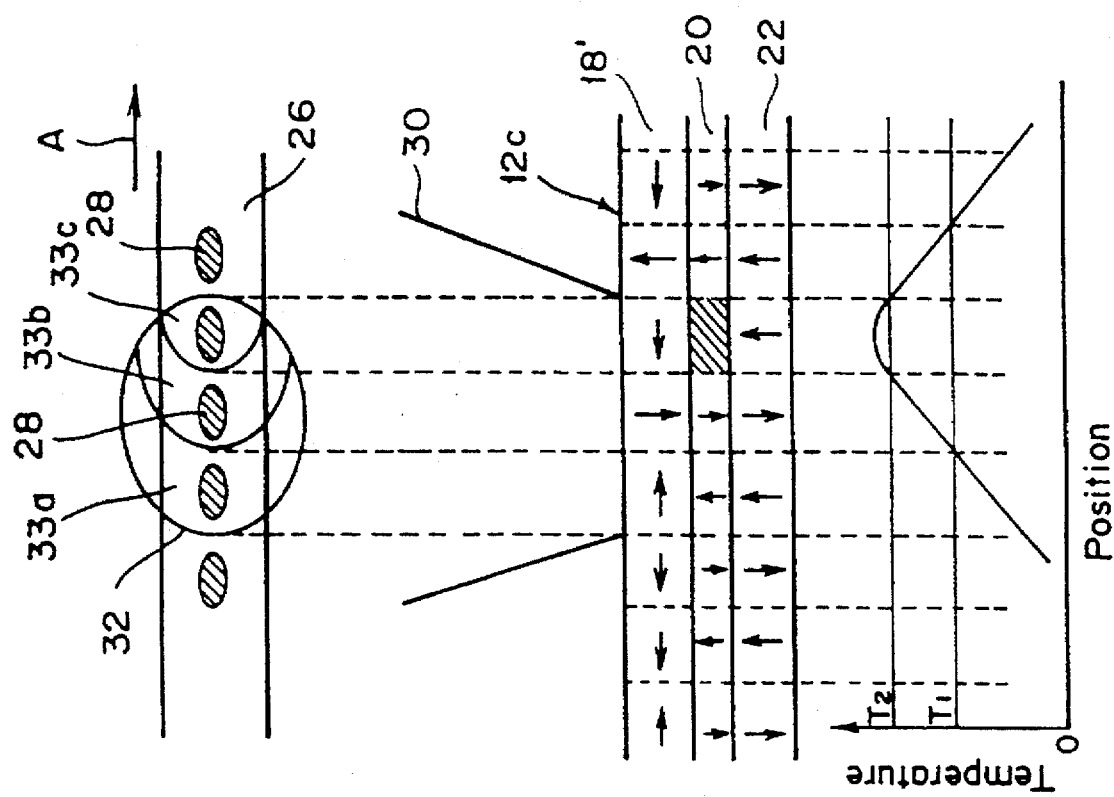
FIG. 15 has an upper portion which is a plan view of a recording medium for explaining a reproducing method relative to the fourth embodiment of the invention; a middle portion which is a sectional view thereof; a lower portion which graphically shows the temperatures of the recording medium.

Referring next to FIG. 15, a description will be given on a method of reproducing the information recorded on the magneto-optical recording medium 12c of the fourth embodiment. As illustrated in FIG. 15, the magneto-optical recording medium 12c is moved in the direction of an arrow A. And a plurality of record marks 28 are formed in a track 26. When a reproducing laser beam 30 is irradiated to the magneto-optical recording medium 12c, a beam spot 32 is formed on the track 26 as illustrated in FIG. 15, so that there is formed, within the beam spot 32, a temperature distribution including a low temperature region 33a, an intermediate temperature region 33b and a high temperature region 33c.

In the intermediate temperature region 33b which is between the temperatures T1 and T2 as shown in the lower portion of FIG. 15, the reproducing layer 18' indicates perpendicular magnetization. Meanwhile in the low temperature region 33a and the high temperature region 33c, the reproducing layer 18' indicates in-plane magnetization. The magnetization of the reproducing layer 18' is such that the low temperature region 33a and the high temperature region 33c correspond respectively to the temperature ranges A and C in FIG. 13 and indicate in-plane magnetization, while the intermediate temperature region 33b corresponds to the perpendicular magnetization temperature range B in FIG. 13.

If the composition of the switch layer 20 is so selected that this layer is heated beyond the Curie temperature thereof in the high temperature region 33c, the magnetization of the reproducing layer 18' is shielded from the perpendicular magnetization of the recording layer 22 and is thereby retained in a stable state of in-plane magnetization. In the low temperature region 33a and the high temperature region 33c, the reproducing layer 18' is turned to a state of in-plane magnetization which makes no contribution to the Kerr rotation of the reproducing laser beam, whereby double masks are formed within the beam spot 32.

The magnetization recorded in the recording layer 22 is transferred to the switch layer 20 and the reproducing layer 18' by switched connection in the intermediate temperature region 33b, whereby the data in the recording layer 22 can be read out by detecting the reflected beam from the magnetization of the reproducing layer 18' in the intermediate temperature region 33b. Thus, according to this embodiment, two in-plane magnetization masks can be formed in the beam spot without the necessity of any reproducing magnetic field, hence realizing high-resolution signal reproduction in a simplified structure.

Now a specific example of the this embodiment will be described below. An SiN dielectric layer 16, a GdFeCo reproducing layer 18', a TbFe switch layer 20, a TbFeCo recording layer 22 and an SiN protective layer 24 were formed successively on a glass substrate 14 by the art of sputtering. The deposition of such layers by sputtering was executed in a vacuum chamber at an ultimate vacuum degree lower than $5 \times 10^{-5}$ Pa under the conditions including an Ar gas pressure of 0.3 Pa and a making power of 0.8 kW at the time of forming the SiN layers 16 and 24, and an Ar gas pressure of 0.5 Pa and a making power of 1.0 kW at the time of forming the magnetic layers 18', 20 and 22.

The respective compositions of such reproducing layer 18', switch layer 20 and recording layer 22 are $Gd_{29}Fe_{46}Co_{25}$, $Tb_{21}Fe_{79}$ and $Tb_{22}Fe_{63}Co_{15}$. These layers are, in film thickness, 30 nm, 10 nm and 40 nm respectively. Meanwhile the Curie temperatures of the reproducing layer 18', the switch layer 20 and the recording layer 22 are 330° C. or more, 130° C. and 250° C. respectively. Bits having a mark length of 0.4 μm were recorded on the magneto-optical recording medium 12c, and the performance characteristics were tested under the recording and reproducing conditions including a linear velocity of 9 m/sec, a recording power of 10.3 mW, a light emission duty ratio of 25 percent and a reproducing power of 2.6 mW. From the result of such measurement, it was confirmed that a satisfactory reproduction output having a C/N of approximately 46 dB is obtainable without applying any reproducing magnetic field.

Figure 16:
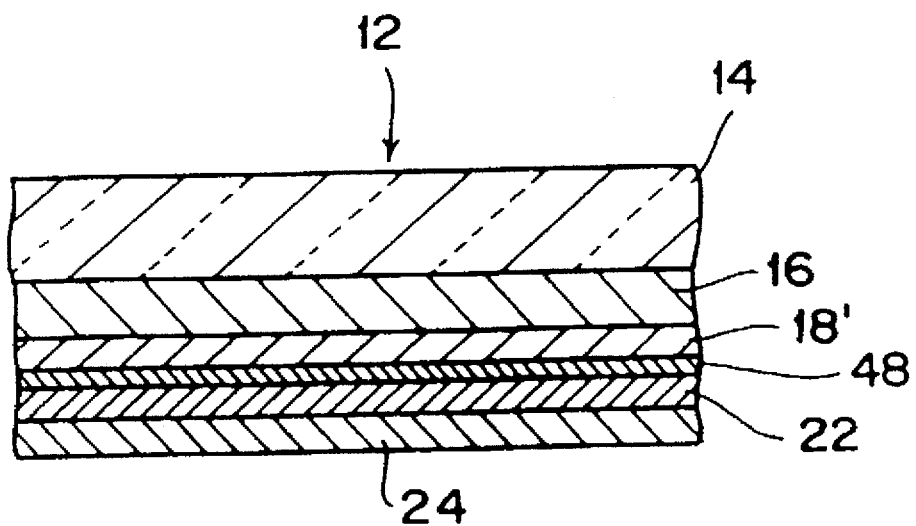
FIG. 16 illustrates the structure of a magneto-optical recording medium in a fifth embodiment of the invention.

FIG. 16 illustrates the structure of a magneto-optical recording medium 12d in a fifth embodiment of the present invention. In a description of this embodiment, any like components substantially corresponding to those in the foregoing fourth embodiment of FIG. 11 are denoted by like reference numerals, and the explanation thereof is partially omitted to avoid duplication. The feature of the fifth embodiment resides in the point that, instead of the magnetic switch layer 20 employed in the fourth embodiment of FIG. 11, a nonmagnetic intermediate layer 48 is interposed between the magnetic reproducing layer 18' and the magnetic recording layer 22. The nonmagnetic intermediate layer 48 is composed of a metal such as Al, Si or Ti, or oxide or nitride thereof.

The nonmagnetic intermediate layer 48 needs to be sufficiently thin to permit magnetostatic connection between the recording layer 22 and the reproducing layer 18' above a predetermined temperature. If the nonmagnetic intermediate layer 48 is thicker than 10 nm, complete magnetostatic connection is not achievable between the reproducing layer 18' and the recording layer 22. Therefore any nonmagnetic intermediate layer 48 thicker than 10 nm is not desirable. To the contrary, when the nonmagnetic intermediate layer 48 is thinner than 1 nm, it becomes impossible to interrupt the strength of switched connection between the reproducing layer 18' and the recording layer 22, so that any inadequately thin intermediate layer is not desirable either. Consequently, an optimal thickness of the nonmagnetic intermediate layer 48 ranges from 1 nm to 10 nm.

Figure 17:
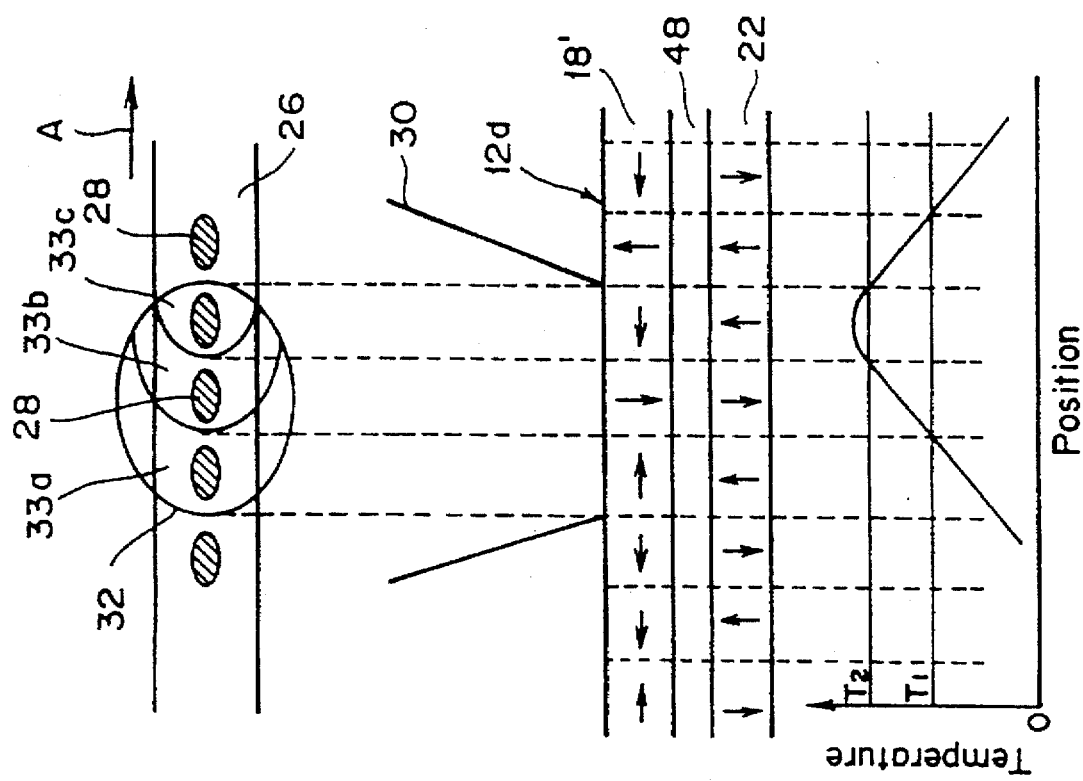
FIG. 17 has an upper portion which is a plan view of a recording medium for explaining a reproducing method relative to the fifth embodiment of the invention; a middle position which is a sectional view thereof; and a lower portion which graphically shows the temperatures of the recording medium.

Referring now to FIG. 17, a description will be given on a method of reproducing the information recorded on the magneto-optical recording medium 12d of the fifth embodiment. According to the reproducing method of this embodiment, the magnetization of the recording layer 22 is transferred to the reproducing layer 18' by magnetostatic connection in the intermediate temperature region 33b within the beam spot 32. The reproducing layer 18' is turned to in-plane magnetization in the low temperature region 33a and the high temperature region 33c, so that double masks can be formed. The recorded data can be read out by detecting the reflected beam from the magnetization of the reproducing layer 18' in the intermediate temperature region 33b.

Figures 18A, 18B:
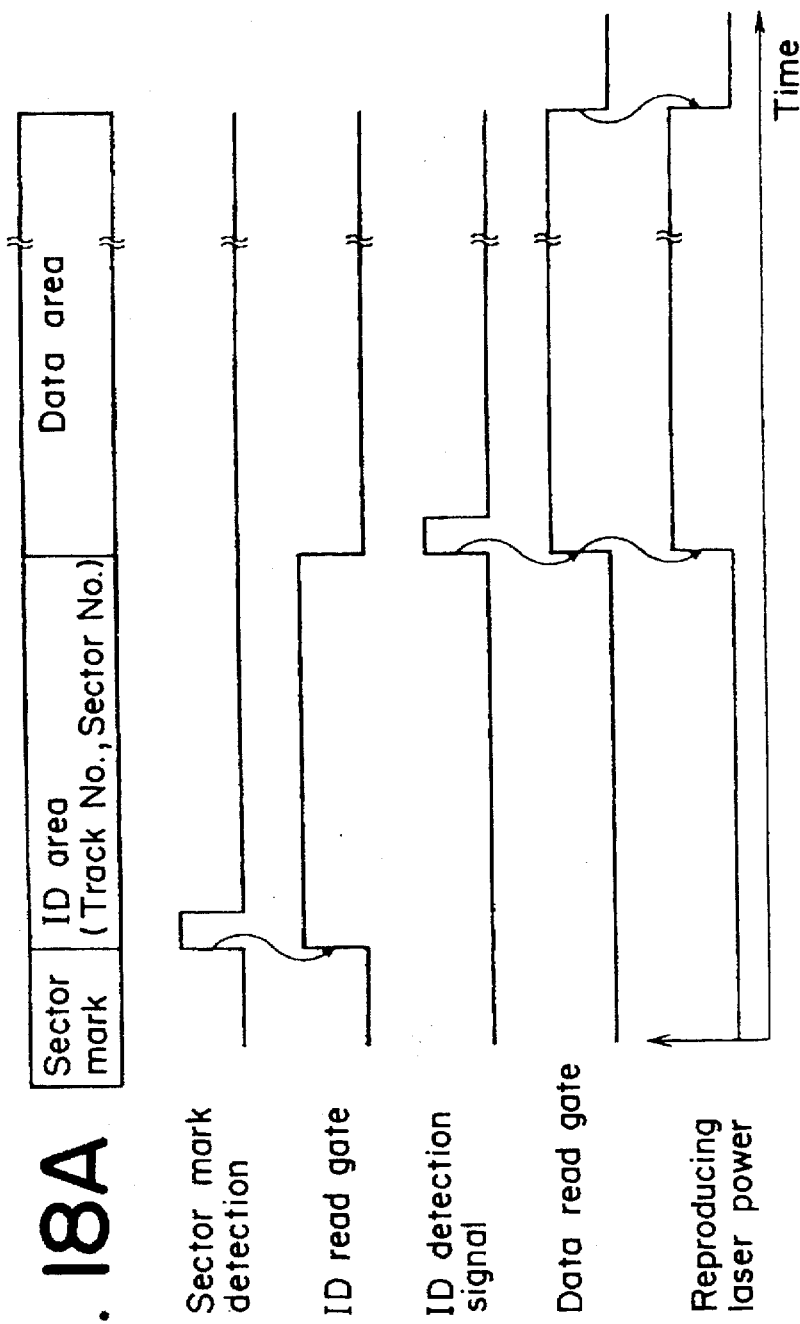
FIG. 18A shows a format of a recording sector.
FIG. 18B is a timing chart of signals in the reproducing method of the invention.

Hereinafter a description will be given on the reproducing method of the present invention which is characterized in switching the reproducing laser beam power at the time of reproduction of the information recorded on an MSR medium. FIG. 18A shows a format of a record sector in an MSR medium, and FIG. 18B is a timing chart of signals in the reproducing method of the invention shown in correspondence to the recording format of FIG. 18A. At the top of each sector in a magneto-optical disk, as shown in FIG. 18A, there are successively formed a sector area where a sector mark is recorded by a preformat signal, and an ID area where a track number and a sector number are recorded by preformat signals. And a data area, where user data is recorded, is formed in succession to such preformat areas.

In a reproduction mode, first the sector mark is detected, and then an ID read gate is opened in response to such detection, so that the data in the ID area is read out therefrom. Upon coincidence of the reproduced ID numbers (track number and sector number) with those of the desired sector to be reproduced, an ID detection signal is outputted. And a data read gate for reproducing the data in the magneto-optically recorded data area is opened in response to such an ID detection signal. Since the number of bytes of the data area per sector is predetermined, the data read gate is closed upon completion of reproducing the data of a predetermined length, whereby the reproduction is terminated.

In the reproducing method of the present invention, the reproducing laser power is greater at the time of reproducing the magneto-optically recorded data than at the time of reproducing the preformatted data or in a standby mode. A data read gate signal for opening the data read gate is used as a timing signal to switch the reproducing laser power. In the open state of the data read gate, i.e., when the data read gate signal is at a high level, the reproducing laser power is raised up to an optimal intensity adequate for reproduction of the data magneto-optically recorded on the MSR medium. Due to such control, the reproducing laser power can be increased with accuracy only during reproduction of the magneto-optically recorded data, while the laser power can be suppressed to a low level in any other case.

Figure 1:
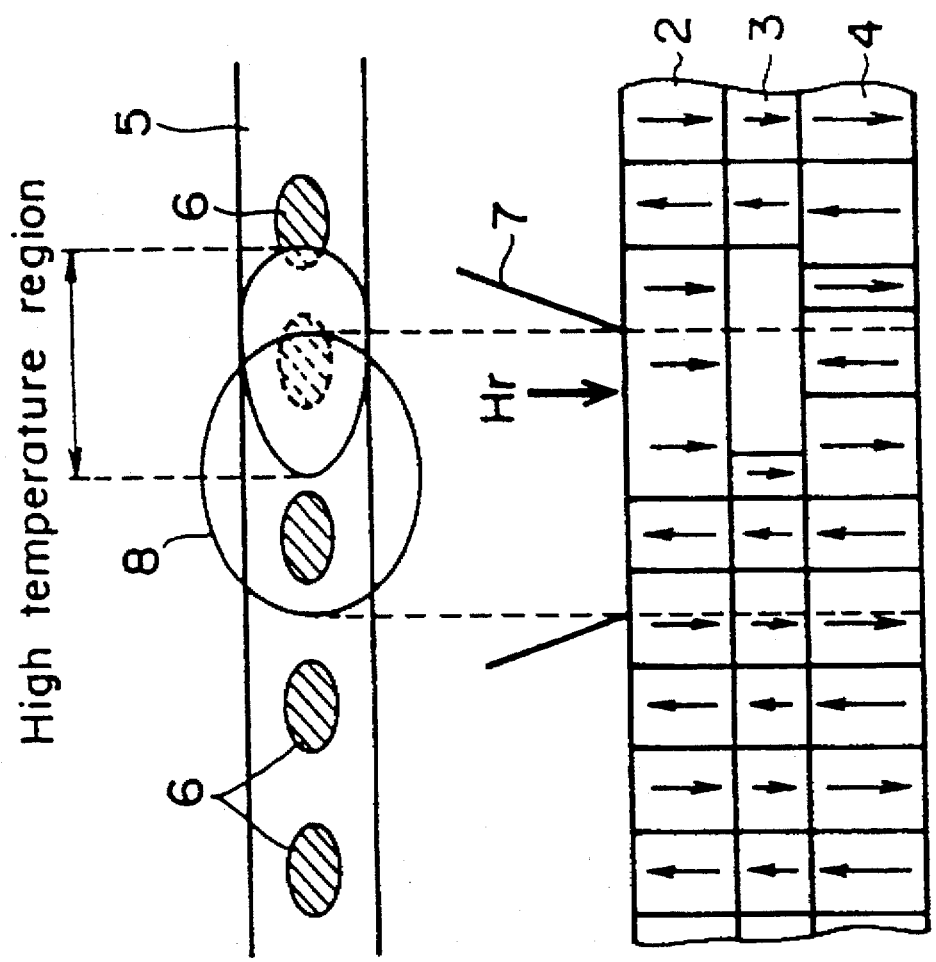
FIG. 1 has an upper portion which is a plan view showing the principle of reproduction of a conventional MSR medium and a lower portion which is a sectional view thereof.
Figure 2:
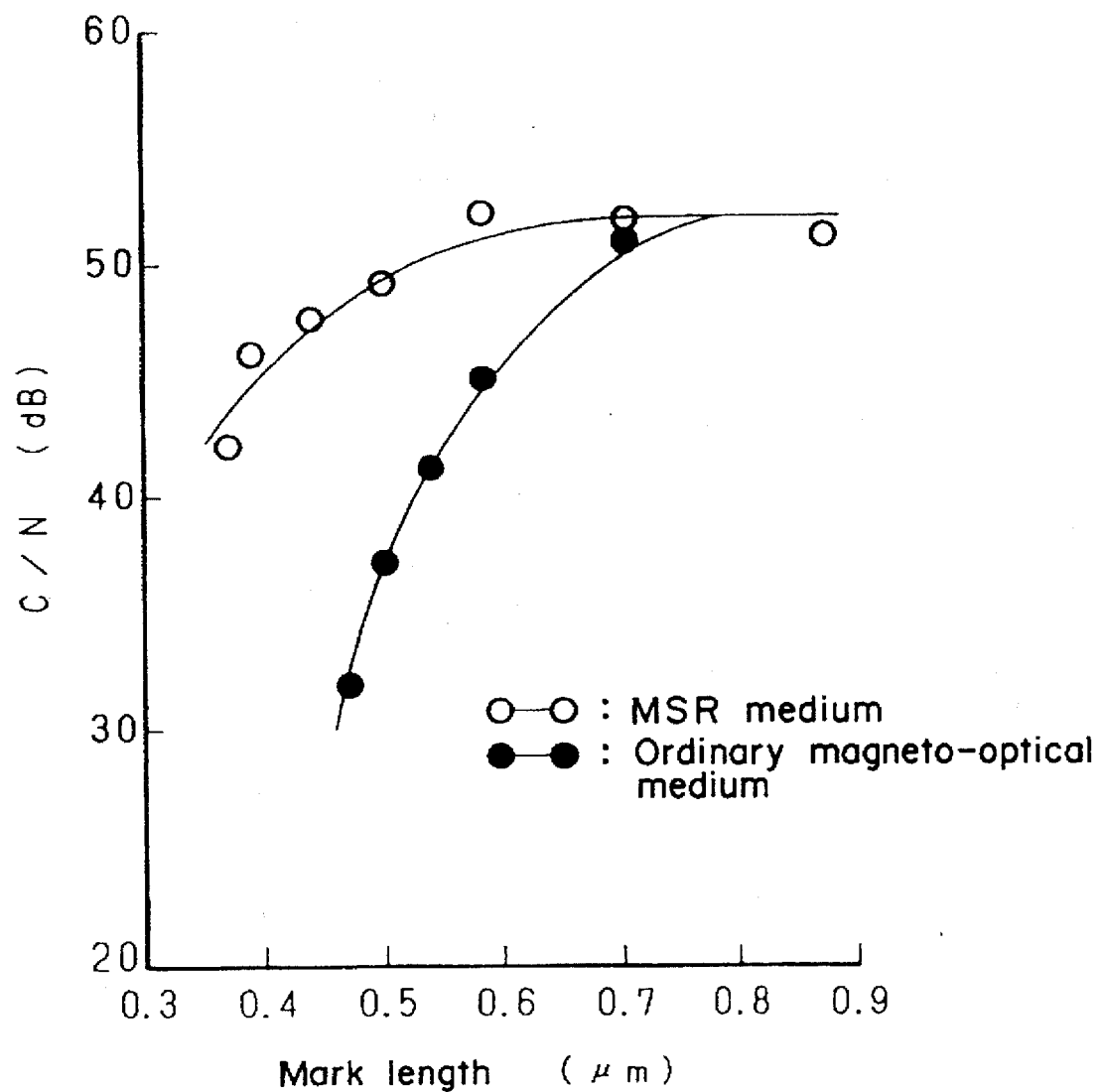
FIG. 2 graphically shows the respective reproduced signal characteristics of an MSR medium and an ordinary magneto-optical recording medium.
Figure 3:
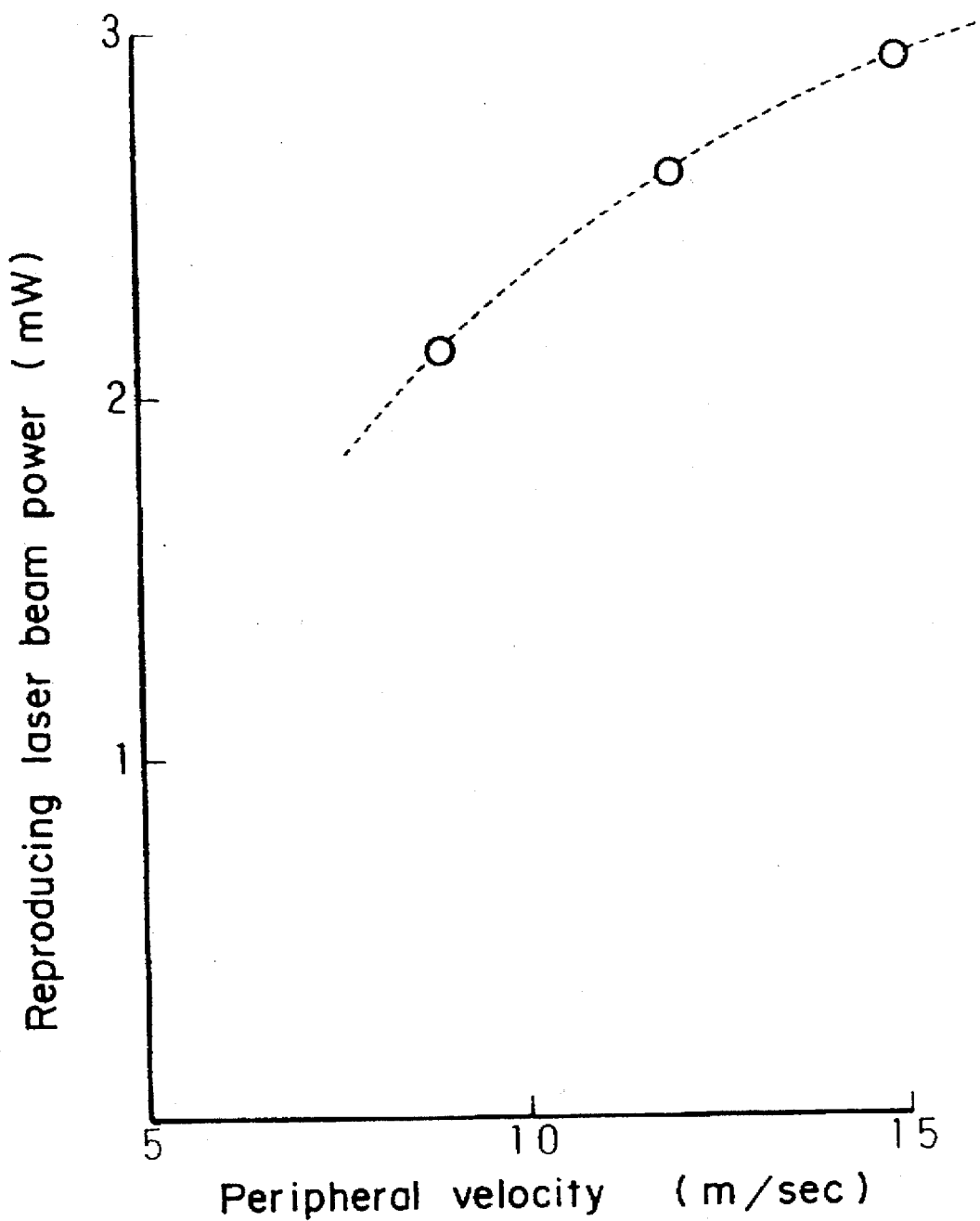
FIG. 3 graphically shows the relationship between the peripheral velocity of an MSR medium and a laser power required for reproducing the same.

Since the superresolution effect is not attained unless an MSR medium is heated beyond a predetermined temperature, the minimum reproducing laser power required for attaining the superresolution effect is different with changes of the peripheral velocity, as shown in FIG. 3. Therefore it is not necessary, during reproduction of the magneto-optically recorded data, to maintain a fixed high-level reproducing laser power, and enhanced effect is achievable by varying the reproduced laser power in accordance with the peripheral velocity.

The peripheral velocity of the MSR medium can be calculated with facility from the radial position of the standardized MSR medium. And the radial position is easily detectable by reading out the track number in the ID area. Therefore, a current value to be supplied to a laser diode for obtaining a minimum required reproducing laser power may be set on the basis of the signal which indicates the track number corresponding to the radial position.

Figure 19:
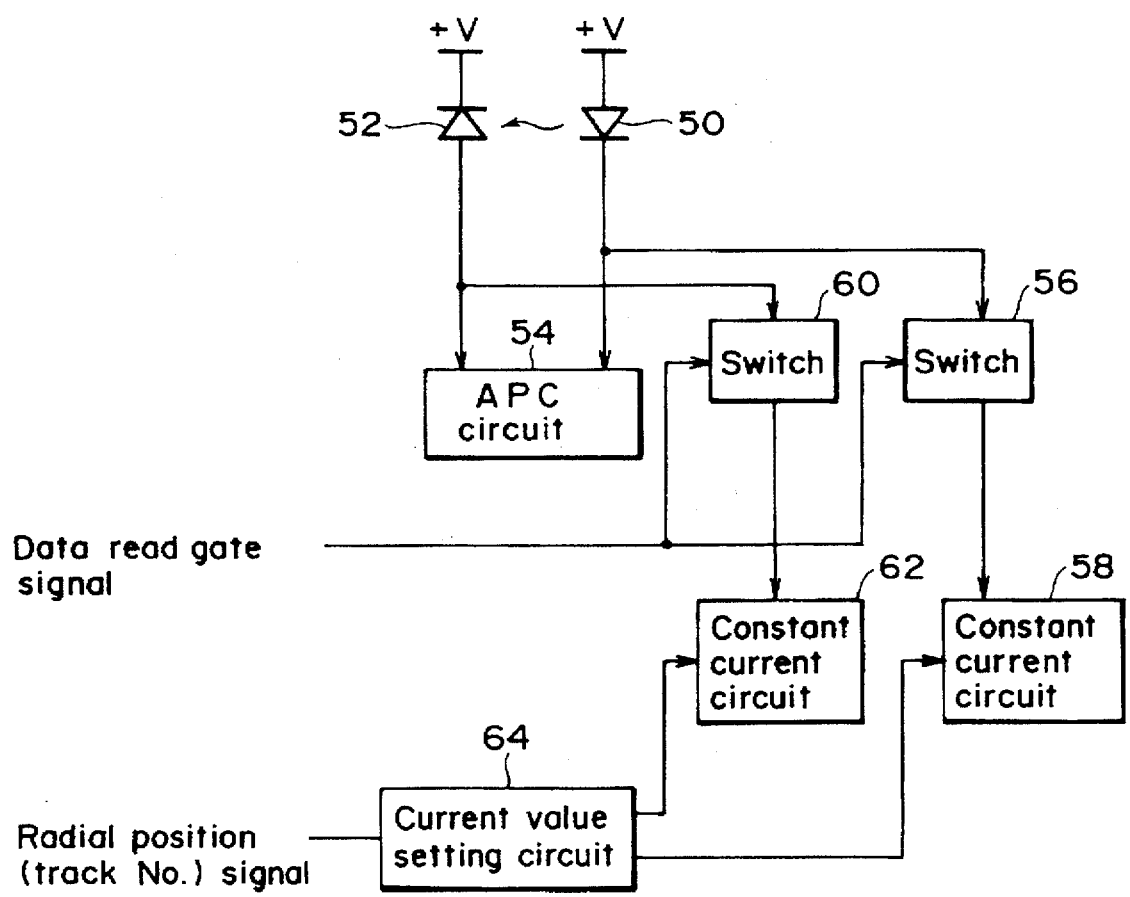
FIG. 19 is a block diagram of circuits for carrying out the reproducing method of the invention.

FIG. 19 is a schematic block diagram of a circuit configuration employed to switch the reproducing laser power in the reproducing method of the present invention. In this diagram, there are shown a laser diode 50 serving as a light beam source, and a photo diode 52 for monitoring a laser beam emitted from the laser diode 50. An automatic power control circuit (APC circuit) 54 controls the current, which is supplied to the laser diode 50, in accordance with the result of monitoring by the photo diode 52, in such a manner that a laser beam of a predetermined power is emitted from the laser diode 50.

A constant current circuit 58 is connected to the laser diode 50 via a switch 56 which is turned on or off under control by the aforementioned data read gate signal. Similarly, another constant current circuit 62 is connected to the photo diode 52 via a switch 60 which is turned on or off under control by the data read gate signal. A current value setting circuit 64 is connected to each of the constant current circuits 58 and 62 so as to set an adequate current value by a signal indicative of the radial position (track number), and the current value setting circuit 64 outputs a set current value to each of the constant current circuits 58 and 62.

In the operation, the data read gate signal is not inputted during a standby state or at the time of reproducing the data recorded in the preformatted area, so that each of the switches 56 and 60 is kept open. The laser diode 50 is activated under control of the APC circuit 54 to emit a light beam with a predetermined low laser power. When the signal indicative of the track number in the ID area has been read out, an adequate current value for outputting a minimum required reproducing laser power corresponding to the peripheral velocity at such track number is set in the current value setting circuit 64 on the basis of the said track number, and the current value thus set is supplied to each of the constant current circuits 58 and 62.

Upon completion of reading the ID area, the data read gate signal is outputted and then is supplied to each of the switches 56 and 60, and simultaneously an operation of reproducing the data from the magneto-optical recording area is started. In this stage of the operation, the laser diode 50 emits a light beam therefrom at the power level required for reproduction of the data in the magneto-optical recording area. Since the switch 56 is closed by the data read gate signal inputted thereto, a current corresponding to a power increment is caused to flow from the laser diode 50 to the constant current circuit 58. And simultaneously the switch 60 is also closed, so that a current equivalent to the above is caused to flow from the photo diode 52 to the constant current circuit 62.

Accordingly, a high reproducing laser power is maintained during the input period of the data read gate signal, whereby the magneto-optically recorded data is reproduced. More specifically, the output current of the photo diode 52 corresponding to the power increment of the output beam from the laser diode 50 is absorbed by the constant current circuit 62, so that the APC circuit 54 continues its control action as if the laser power remains unchanged. And when the data read gate signal is no longer inputted, i.e., upon termination of reproducing the magneto-optically recorded data, a low-power laser beam is outputted from the laser diode 50. Since the circuit configuration shown in FIG. 19 is equal to the one employed for generating a recording laser power in a recording mode, these two circuits may be used in common as well.

Thus, according to the present invention, the data recorded on the medium with high resolution can be reproduced without the necessity of a reproducing magnetic field. Due to the nonnecessity of any reproducing magnetic field, it is not needed to modify the construction of an ordinary optical disk apparatus for achieving proper reproduction of the data recorded on the MSR medium. Furthermore, in the reproducing method of the present invention where a reproducing laser power is raised merely when reproducing the magneto-optically recorded data, the service life of the laser beam source is not shortened regardless of any MSR medium, whereby satisfactory data reproduction can be performed with an adequate reproducing laser power.

What is claimed is:

1. A magneto-optical recording medium comprising:
   a substrate transparent to a laser beam;
   a magnetic reproducing layer formed on said transparent substrate and having an easy direction of magnetization perpendicular to a film plane at a room temperature, and having an in-plane easy direction of magnetization when heated beyond a first predetermined temperature above said room temperature;
   a magnetic switch layer having a specific composition formed on said reproducing layer and having an easy direction of magnetization perpendicular to said film plane at said room temperature; and a magnetic recording layer formed on said switch layer and having an easy direction of magnetization perpendicular to said film plane at said room temperature;

wherein respective Curie temperatures Tc1, Tc2 and Tc3 of said reproducing layer, switch layer and recording layer satisfy the relationship of Tc1>Tc3>Tc2.

2. The magneto-optical recording medium according to claim 1, wherein said reproducing layer is composed of GdFeCo, and the amount of Gd contained therein is in a range of about 18 to 24 atomic percent.

3. The magneto-optical recording medium according to claim 1, wherein a magnetic auxiliary layer having the same composition as that of said switch layer is interposed between said substrate and said magnetic reproducing layer.

4. The magneto-optical recording medium according to claim 1, wherein said Curie temperature Tc2 of said switch layer is lower than said first predetermined temperature.

5. A magneto-optical recording medium comprising:

a substrate transparent to a laser beam;

a magnetic reproducing layer formed on said transparent substrate and having an in-plane easy direction of magnetization at a room temperature, and having an easy direction of magnetization perpendicular to a film plane when heated beyond a first predetermined temperature above said room temperature;

a magnetic reproducing auxiliary layer formed on said reproducing layer and having an easy direction of magnetization perpendicular to said film plane at said room temperature, and having an in-plane easy direction of magnetization when heated beyond a second predetermined temperature above said room temperature;

a magnetic switch layer formed on said reproducing auxiliary layer and having an easy direction of magnetization perpendicular to said film plane at said room temperature; and a magnetic recording layer formed on said switch layer and having an easy direction of magnetization perpendicular to said film plane at said room temperature;

wherein respective Curie temperatures Tc1, Tc2, Tc3 and Tc4 of said reproducing layer, reproducing auxiliary layer, switch layer and recording layer satisfy the relationship of Tc1>Tc2>Tc4>Tc3.

6. The magneto-optical recording medium according to claim 5, wherein said reproducing layer is composed of GdFeCo, and the amount of Gd contained therein is in a range of about 29 to 32 atomic percent.

7. The magneto-optical recording medium according to claim 5, wherein said reproducing auxiliary layer is composed of GdFeCo, and the amount of Gd contained therein is in a range of about 18 to 24 atomic percent.

8. The magneto-optical recording medium according to claim 5, wherein the Curie temperature of said switch layer is lower than said second predetermined temperature.

9. The magneto-optical recording medium according to claim 8, wherein said switch layer is composed to TbFeCo having a Curie temperature Tc3 of about 120° C. to 160° C.

10. A magneto-optical recording medium comprising:

a substrate transparent to a laser beam;

a magnetic reproducing layer formed on said transparent substrate and having an easy direction of magnetization perpendicular to a film plane in a specific region of said reproducing layer when heated, and having an in-plane easy direction of magnetization in any region other than said specific heated region having a temperature lower or higher than that of said specific heated region;

a magnetic switch layer formed on said reproducing layer and having an easy direction of magnetization perpendicular to said film plane at a room temperature; and a magnetic recording layer formed on said switch layer and having an easy direction of magnetization perpendicular to a film plane at said room temperature;

wherein respective Curie temperatures Tc1, Tc2 and Tc3 of said reproducing layer, switch layer and recording layer satisfy the relationship of Tc1>Tc3>Tc2.

11. The magneto-optical recording medium according to claim 10, wherein said reproducing layer is composed of GdFeCo, and the amount of Gd contained therein is in a range of about 24 to 35 atomic percent, while the amount of Co is in a range of about 23 to 35 atomic percent.

12. The magneto-optical recording medium according to claim 10, wherein said switch layer is composed of TbFeCo having a Curie temperature Tc2 in said specific heated region.

13. The magneto-optical recording medium according to claim 12, wherein the Curie temperature Tc2 of said switch layer is in a range of about 100° C. to 170° C.

14. The magneto-optical recording medium according to claim 10, wherein said switch layer is composed of TbFe having a Curie temperature Tc2 in said specific heated region.

15. The magneto-optical recording medium according to claim 14, wherein the Curie temperature Tc2 of said switch layer is in a range of about 100° C. to 170° C.

16. A magneto-optical recording medium comprising:

a substrate transparent to a laser beam;

a magnetic reproducing layer formed on said transparent substrate and having an easy direction of magnetization perpendicular to a film plane when heated to a predetermined temperature, and having in-plane easy direction of magnetization when said reproducing layer is at a temperature lower or higher than said predetermined temperature;

a nonmagnetic intermediate layer formed on said reproducing layer; and a magnetic recording layer formed on said nonmagnetic intermediate layer and having an easy direction of magnetization perpendicular to said film plane at a room temperature;

wherein said reproducing layer has a Curie temperature higher than that of said recording layer, and said nonmagnetic intermediate layer is sufficiently thin to permit magnetostatic connection between said recording layer and said reproducing layer at said predetermined temperature.

17. The magneto-optical recording medium according to claim 16, wherein said reproducing layer is composed of GdFeCo, and the amount of Gd contained therein is in a range of about 24 to 35 atomic percent, while the amount of Co is in a range of about 23 to 35 atomic percent.

18. The magneto-optical recording medium according to claim 16, wherein said nonmagnetic intermediate layer is composed of a material selected from the group consisting of Al, Si, Ti, and oxide and nitride thereof.

19. A method of reproducing information recorded on a magneto-optical recording medium which comprises a substrate transparent to a laser beam, a magnetic reproducing layer formed on said transparent substrate and having an easy direction of magnetization perpendicular to a film plane at a room temperature, and having an in-plane easy direction of magnetization when heated beyond a first predetermined temperature above said room temperature, a magnetic switch layer formed on said reproducing layer and having an easy direction of magnetization perpendicular to said film plane at said room temperature, and a magnetic recording layer formed on said switch layer and having an easy direction of magnetization perpendicular to said film plane at said room temperature, wherein respective Curie temperatures Tc1, Tc2 and Tc3 of said reproducing layer, switch layer and recording layer satisfy the relationship of Tc1>Tc3>Tc2, said method comprising the steps of:

irradiating said laser beam to said recording medium to thereby heat the same below the Curie temperature of said recording layer; and forming, within a beam spot, a temperature distribution having a low temperature transfer region having a temperature below the Curie temperature of said switch layer wherein the magnetization of said recording layer is transferred to said switch layer and said reproducing layer by switched connection, and a high temperature mask region having a temperature equal to or above the Curie temperature of said switch layer, wherein said switch layer is heated beyond the Curie temperature thereof so that the magnetization of said reproducing layer is directionally turned from perpendicular to said film plane to in-plane one thereto.

20. The information reproducing method according to claim 19, wherein said magneto-optical recording medium has a preformatted part including a sector area and an ID area, and the reproducing laser beam power used at the time of reproducing the recorded information is switched to a laser beam power greater than a reproducing laser beam power for reproduction of the data in said preformatted part or a laser beam power in a standby state.

21. The information reproducing method according to claim 20, wherein the step of selectively switching the reproducing laser beam power is executed in response to a magneto-optical data read gate signal obtained on the basis of a detection signal relative to the ID area in said preformatted part.

22. The information reproducing method according to claim 20, wherein the reproducing laser beam power is increased or suppressed in coincidence with a position of reproduction of the magneto-optical recording medium.

23. The information reproducing method according to claim 21, wherein a circuit for switching the reproducing laser beam power is used also as a circuit for generating a recording laser beam power.

24. A method of reproducing information recorded on a magneto-optical recording medium which comprises a substrate transparent to a laser beam, a magnetic reproducing layer formed on said transparent substrate and having an in-plane easy direction of magnetization at a room temperature, and having an easy direction of magnetization perpendicular to a film plane when heated beyond a first predetermined temperature above said room temperature, a magnetic reproducing auxiliary layer formed on said reproducing layer and having an easy direction of magnetization perpendicular to said film plane at said room temperature, and having an in-plane easy direction of magnetization when heated beyond a second predetermined temperature, a magnetic switch layer formed on said reproducing auxiliary layer and having an easy direction of magnetization perpendicular to said film plane at said room temperature, and a magnetic recording layer formed on said switch layer and having an easy direction of magnetization perpendicular to said film plane at said room temperature, wherein respective Curie temperatures Tc1, Tc2, Tc3 and Tc4 of said reproducing layer, reproducing auxiliary layer, switch layer and recording layer satisfy a relationship of Tc1>Tc2>Tc4>Tc3, said method comprising the steps of:

irradiating said laser beam to said recording medium to thereby heat the same below the Curie temperature of said recording layer; and forming, within a beam spot, a temperature distribution having a low temperature mask region having a temperature below the Curie temperature of said switch layer wherein the magnetization of said reproducing layer is directionally turned from perpendicular to said film plane to in-plane one thereto, an intermediate temperature transfer region where the magnetization of said recording layer is transferred to said reproducing layer via said switch layer and said reproducing auxiliary layer, and a high temperature mask region having a temperature equal to or above the Curie temperature of said switch layer wherein said switch layer is heated beyond the Curie temperature thereof so that the magnetization of each of said reproducing auxiliary layer and said reproducing layer is directionally turned from perpendicular to said film plane to in-plane thereto.

25. A method of reproducing information recording on a magneto-optical recording medium which comprises a substrate transparent to a laser beam, a magnetic reproducing layer formed on said transparent substrate and having an easy direction of magnetization perpendicular to a film plane in a specific region of said reproducing layer that is heated, and having an in-plane easy direction of magnetization in any region other than said specific heated region having a temperature lower or higher than that of the temperature of said specific heated region, a magnetic switch layer formed on said reproducing layer and having an easy direction of magnetization perpendicular to said film plane at a room temperature, and a magnetic recording layer formed on said switch layer and having an easy direction of magnetization perpendicular to said film plane at said room temperature, wherein respective Curie temperatures Tc1, Tc2 and Tc3 of said reproducing layer, switch layer and recording layer satisfy a relationship of Tc1>Tc3>Tc2, said method comprising the steps of:

irradiating said laser beam to said recording medium to thereby heat the same below the Curie temperature of said recording layer; and forming, within a beam spot, a temperature distribution having a low temperature mask region having a temperature below the Curie temperature of said switch layer wherein the magnetization of said reproducing layer is directionally turned from perpendicular to said film plane to in-plane thereto, an intermediate temperature transfer region where the magnetization of said recording layer is transferred to said reproducing layer via said switch layer, and a high temperature mask region having a temperature equal to or above the Curie temperature of said switch layer so that the magnetization of said reproducing layer is directionally turned from perpendicular to the plane to in-plane thereto.

26. A method of reproducing information recorded on a magneto-optical recording medium which comprises a substrate transparent to a laser beam, a magnetic reproducing layer formed on said transparent substrate and having an easy direction of magnetization perpendicular to a film plane when heated to a predetermined temperature, and having an in-plane easy direction of magnetization when heated to a temperature lower or higher than said predetermined temperature, a nonmagnetic intermediate layer formed on said reproducing layer, and a magnetic recording layer formed on said nonmagnetic intermediate layer and having an easy direction of magnetization perpendicular to said film plane at a room temperature, wherein said reproducing layer has a Curie temperature higher than that of said recording layer, and said nonmagnetic intermediate layer is sufficiently thin to permit magnetostatic connection between said recording layer and said reproducing layer at said predetermined temperature, said method comprising the steps of:

irradiating the laser beam on said recording medium to thereby heat the same to a temperature below the Curie temperature of said recording layer; and forming, within a beam spot, a temperature distribution having a low temperature mask region having a temperature lower than said predetermined temperature wherein the magnetization of said reproducing layer is directionally turned from perpendicular to the film plane to in-plane thereto, an intermediate temperature transfer region where the magnetization of said recording layer is transferred to said reproducing layer by magnetostatic connection, and a high temperature mask region having a temperature higher than said predetermined temperature wherein the magnetization of said reproducing layer is directionally turned from perpendicular to said film plane to in-plane thereto.

* * * * *